(12) United States Patent
Winden

(10) Patent No.: US 11,305,802 B2
(45) Date of Patent: Apr. 19, 2022

(54) HAND TRUCK EASY HITCH

(71) Applicant: Steve Winden, Mesa, AZ (US)

(72) Inventor: Steve Winden, Mesa, AZ (US)

(*) Notice: Subject to any disclaimer, the term of this patent is extended or adjusted under 35 U.S.C. 154(b) by 289 days.

(21) Appl. No.: 16/727,981

(22) Filed: Dec. 27, 2019

(65) Prior Publication Data
US 2020/0361508 A1 Nov. 19, 2020

Related U.S. Application Data

(60) Provisional application No. 62/848,021, filed on May 15, 2019.

(51) Int. Cl.
| | |
|---|---|
| *B62B 5/00* | (2006.01) |
| *B60D 1/52* | (2006.01) |
| *B60D 1/06* | (2006.01) |
| *B62B 1/12* | (2006.01) |
| *B62B 1/10* | (2006.01) |
| *B60D 1/00* | (2006.01) |

(52) U.S. Cl.
CPC ............ *B62B 5/0003* (2013.01); *B60D 1/065* (2013.01); *B60D 1/52* (2013.01); *B62B 1/12* (2013.01); *B60D 2001/005* (2013.01); *B62B 1/10* (2013.01)

(58) Field of Classification Search
CPC ........... B62B 5/0003; B62B 1/12; B62B 1/10; B60D 1/065; B60D 1/52; B60D 2001/005
See application file for complete search history.

(56) References Cited

U.S. PATENT DOCUMENTS

| | | | |
|---|---|---|---|
| 3,887,208 A * | 6/1975 | Vidal | B62K 27/003 |
| | | | 280/648 |
| 5,181,822 A | 1/1993 | Allsop et al. | |
| 5,845,831 A | 12/1998 | Nusbaum et al. | |
| 6,155,588 A | 12/2000 | Maxey | |
| 6,237,823 B1 | 5/2001 | Stewart et al. | |
| 6,314,891 B1 | 11/2001 | Larson | |
| 7,641,235 B1 | 1/2010 | Anduss | |
| 8,123,238 B1 | 2/2012 | Burgess | |
| 8,210,559 B2 | 7/2012 | Russell | |
| 8,480,149 B2 | 7/2013 | Durand | |
| 8,505,951 B2 | 8/2013 | Bohse | |
| 9,096,160 B2 | 8/2015 | Le Anna | |
| 9,216,698 B2 | 12/2015 | Rhodes | |
| 10,059,276 B2 | 8/2018 | Phillips | |
| 10,112,523 B2 | 10/2018 | McConn et al. | |
| 10,189,419 B2 | 1/2019 | Billard | |
| 10,315,474 B2 | 6/2019 | Reynolds | |
| 2004/0173654 A1 | 9/2004 | McAlister | |
| 2008/0101899 A1 | 5/2008 | Slonecker | |
| 2010/0066069 A1 | 3/2010 | Bradshaw | |

(Continued)

FOREIGN PATENT DOCUMENTS

| | | |
|---|---|---|
| EP | 2641758 A1 | 9/2013 |
| WO | 2019006557 A1 | 1/2019 |

*Primary Examiner* — Minnah L Seoh
*Assistant Examiner* — Abigail R Hymel
(74) *Attorney, Agent, or Firm* — Dietz Law Office LLC

(57) ABSTRACT

An apparatus for interconnecting a hand truck or dolly to a vehicle receiver or hitch while hauling a heavy load. The apparatus includes a base, an extendable lever arm and a separable intermediary glide. The base couples with the hand truck, the lever arm is extendable from the base, and the intermediary glide interconnects the lever arm to a receiver attached to a vehicle.

20 Claims, 31 Drawing Sheets

(56) References Cited

U.S. PATENT DOCUMENTS

| | | | |
|---|---|---|---|
| 2015/0137484 A1* | 5/2015 | Columbia | B60D 1/58 |
| | | | 280/507 |
| 2018/0022287 A1* | 1/2018 | Sorey | B62B 3/00 |
| | | | 224/519 |
| 2018/0333998 A1* | 11/2018 | Jones, Jr. | B60D 1/58 |
| 2019/0168555 A1 | 6/2019 | Axelson, Jr. | |

* cited by examiner

HAND TRUCK EASY HITCH

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

The present invention relates to an interconnection between a vehicle and a connecting hitch. More particularly, the invention relates to a hitch or receiver and receiver interconnection that is utilized to join a hand truck or dolly to a vehicle. The receiver assembly in accordance with the present invention allows a user to wheel a loaded dolly to a vehicle and secure the dolly to the vehicle receiver for transport, without requiring ramps or a linear vertical lifting of the dolly to a height of the vehicle's hitch receiver.

BACKGROUND

Over the years various mechanism have been contrived to ease the burden of moving a heavy load. By way of example, a person may desire to load a piece of heavy goods into a vehicle's rearward compartment, box or bed. To move the heavy goods a person may utilize for example, ramps and a hand truck, cranes, lift gates, multiple people to lift the goods safely to the vehicle, or other hoisting mechanisms. Use of these mechanisms may require additional space within a vehicle to allow a person to load and unload the heavy goods. Further, use of these mechanisms often requires more than one person to load or unload the heavy goods. External cargo racks have been attached to a vehicle receiver, however, when loading the cargo rack vertical lifting of the load is required to load the cargo rack at the height of the vehicle receiver. Alternatively, a ramp may be required to move a heavy load from the ground to the height of the cargo rack engaged to the vehicle receiver. The present invention provides an apparatus that one person may use without ramps to secure and remove heavy equipment from an exterior of a vehicle while utilizing a hitch receiver attached to the vehicle. Further, the invention allows one user to couple and uncouple a hand truck to a vehicle hitch receiver without the need for ramps, lift gates, or multiple persons. Additionally, the invention includes a lock mechanism that ensures that portions of the invention do not unintentionally pull out of the vehicle while unloading the hand truck.

SUMMARY

Embodiments of the invention include a device to allow a single person to be able to load/unload a hand-truck or dolly to/from a receiver or hitch while reducing the required lifting force. The device remains engaged to the hand truck when the hand truck is coupled to the vehicle receiver. The apparatus attaches to a hand-truck and allows for a "shaft" to reach up to vehicle receiver while the hand truck is at ground level. The vehicle receiver may be incorporated into a trailer hitch receiver or may be attached to a vehicle independent of the vehicle's trailer hitch. The shaft attaches to a "glide" inserted into the receiver allowing the load secured on hand truck to be raised off the ground, then slid into the receiver for secure attachment to the vehicle.

According to aspects of the invention the apparatus is well suited for connecting a hand truck or dolly to a receiver attached to a vehicle. The apparatus includes a base, a lever arm and a glide. The base has a hand truck receiving portion to which a hand truck may be attached. The lever arm extends from the base. A free end portion of the lever arm extends outward from the base and terminates in a claw. The free end portion is adapted to be received within the receiver. The glide is separable from the lever arm and receiver, wherein the glide is adapted to be received within the receiver. The glide has a pivot member that is adapted to couple with the claw of the lever arm. A vehicle's trailer hitch receiver may be modified so that the receiver is long enough to contain the glide and a portion of the lever arm when the dolly is connected to the vehicle.

Embodiments according to aspects of the invention may additionally include an end portion of the lever arm that is slidingly extendable from the base. Also, a lever lock may be coupled to the base in a manner having two positions: a first locked position that engages the lever arm and a second extending position that disengages the lever arm from the lock. The base may further include a storage slot formed in the base that is well suited and adapted for storing the glide within the base. The glide may further include a button ball release that compresses into the glide and actuates outward from the glide when a compressing force is not present. The button ball release engages a hole formed in the hitch receiver for the hitch pin. When compressed, the glide may be slid further into the hitch receiver. Low friction wear plates may be attached to sides or top and bottom of the glide and lever arm to facilitate smooth sliding of the lever arm and glide within the hitch receiver. The lever arm may further include an aperture extending through a sidewall of the lever arm, wherein the aperture adaptable to receive a hitch pin. The hitch pin may be used to lock base and lever arm to the hitch receiver of the vehicle. In this manner, a hand truck may be locked in place to the back end of a vehicle.

A further embodiment according to aspects of the invention includes a base, lever arm and glide. The base is adapted to couple with a hand truck or dolly. The lever arm is extendable from the base, wherein the lever arm has an end portion slidingly engaged with the base and a free end portion extending outward from the base. The free end portion includes a claw wherein the free end portion is adapted to be received within a trailer hitch receiver. The glide is separate from the lever arm and trailer hitch receiver, wherein the glide is adapted to be received within the trailer hitch receiver and has a pivot member that is adapted to couple with the claw of the lever arm. Embodiments according to aspects of this invention may further include a lever lock coupled to the base. The lock has a first locked position that engages the lever arm and has a second extending position that disengages the lever arm from the lock. When the lock is in the extending position the lever arm may slide outward from the base. A storage slot may be formed in the base and dimensioned to receive and store the glide within the base. The glide may further include a compressible button ball release that compresses inward into a hollow portion the glide. The button ball release is sized to engage within a hitch pin hole formed in the vehicle receiver. When engaged, the button ball retains the glide in a fixed position within the vehicle receiver. A user may compress the button ball release and slide the glide further into the vehicle receiver. The lever arm includes an aperture extending through a sidewall of the lever arm, wherein the aperture adaptable to receive a hitch pin. The claw of the lever arm may engage the pivot pin of the glide. The base may be pushed such that the lever arm presses against the glide and slides into the vehicles receiver until the aperture of the lever arm aligns with the hitch pin hole of the receiver.

A still further embodiment according to aspects of the invention includes a base, lever arm and glide that act together to connect a hand truck to the trailer hitch receiver of a vehicle. The base includes a hand truck receiving portion that couples or is fixed to a hand truck. The lever arm slides within a channel formed in the base and may extend between a stowed position and a lift position. The lever arm has a rearward end portion that slides within the base. On the opposite end of the lever arm is a free end portion that extends outward from the base and includes a claw formed on the end portion. The free end portion and claw are adapted to be received within the trailer hitch receiver. The glide is separable from both the lever arm and trailer hitch receiver. The glide is adapted to be received within the trailer hitch receiver. The glide has a pivot member adapted to couple with the claw of the lever arm. The glide also includes a compressible button ball release that engages the trailer hitch receiver to lock the glide in the receiver during loading. Additionally, a lever lock is coupled to the base. The lock has a first locked position that engages the lever arm to restrict movement of the lever arm within the base. The lock has a second extending position that disengages the lever arm from the lock to allow the sliding and extension of the lever arm from the base. Low friction wear plates may be attached to sides of the glide and lever arm to reduce the required force to push the glide and lever arm into the receiver.

In accordance with further aspects of the invention the base may be solidly attached (welded) to a hand-truck or may be fastened or otherwise coupled to the tongue portion of a hand truck. The lever arm or shaft protrudes and retracts into base to allow for increased vertical reach when mounting the hand-truck to the vehicle hitch. The glide has ball catches that may be used to temporarily hold the glide in place when attempting to hook up the lever arm or shaft to the glide. The glide is designed to reduce drag when the weight of the load on the hand-truck transfers to glide. Also, the lever arm or shaft is designed to reduce drag while sliding in and out of the receiver under load, while maintaining tight clearances for exacting operation. The lever arm or shaft is designed to lock into an extended position while the hand truck is tilted back and engaged to the glide. The lock is spring loaded to allow the lever arm or shaft to retract into body and automatically stop when in mounted or travel ready position. A compartment or slot is formed in the base allowing the glide to be stored in the body or base in a secure location during storage. The glide slides out of receiver when unloading, stopping at hitch pin hole when the compressible ball catches engage the hitch pin holes. Once the glide is locked the hand cart may be tilted until the wheels reach the ground. Those skilled in the art will appreciate that the apparatus of the invention is not limited to any specific size dolly or hand-cart and the apparatus can be scaled to accommodate different load sizes and weights. The lever arm is fixed to the vehicle receiver with a hitch pin and is not limited to size or hole setback distance. The base and hand cart allow for multiple methods of securing a load to a vehicle.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
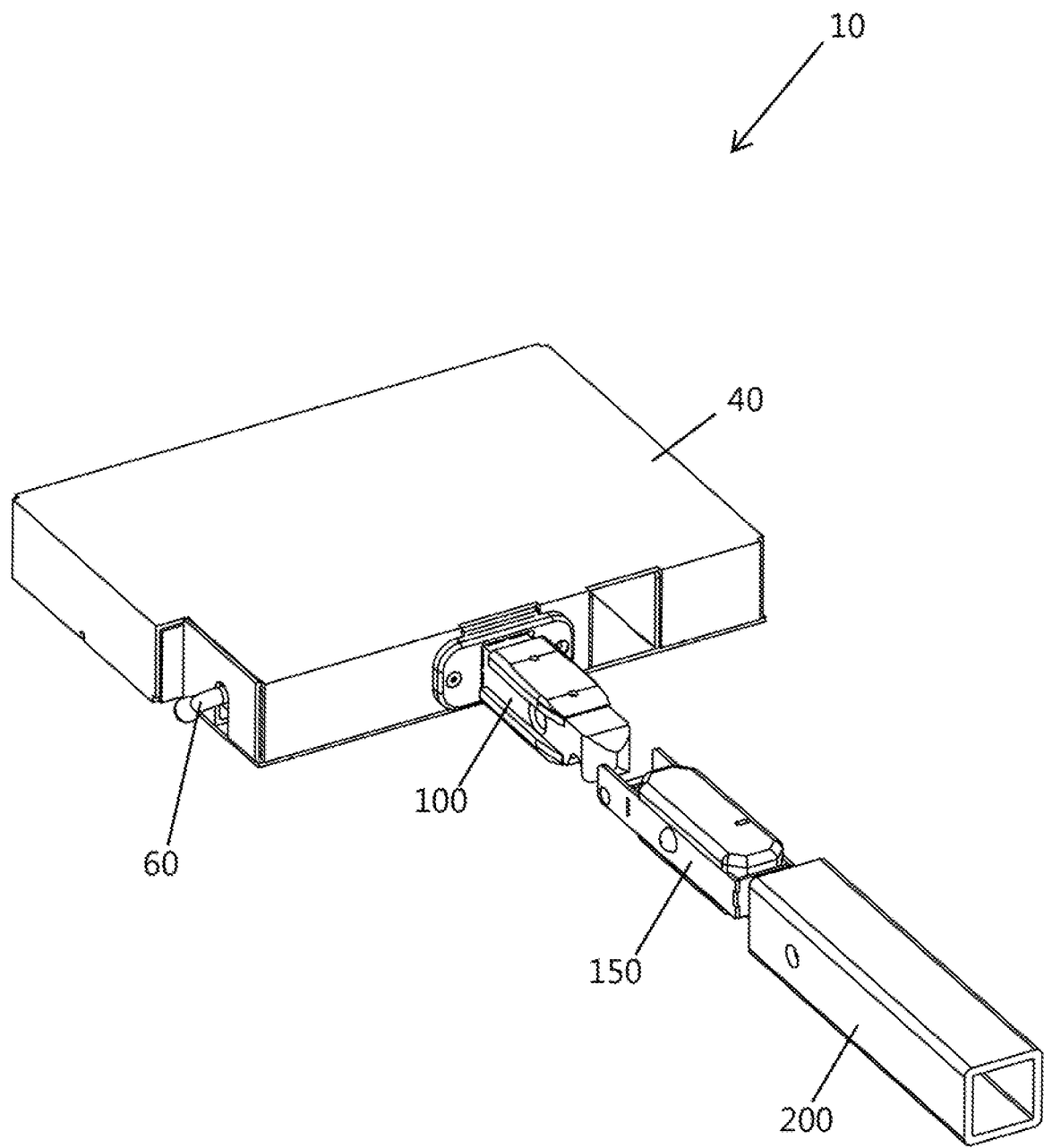
FIG. 1 is a top front perspective view of an apparatus for connecting a hand truck to the trailer hitch receiver of a vehicle in accordance with an embodiment of the present invention, showing the base, glide and receiver aligned but uncoupled.
Figure 2:
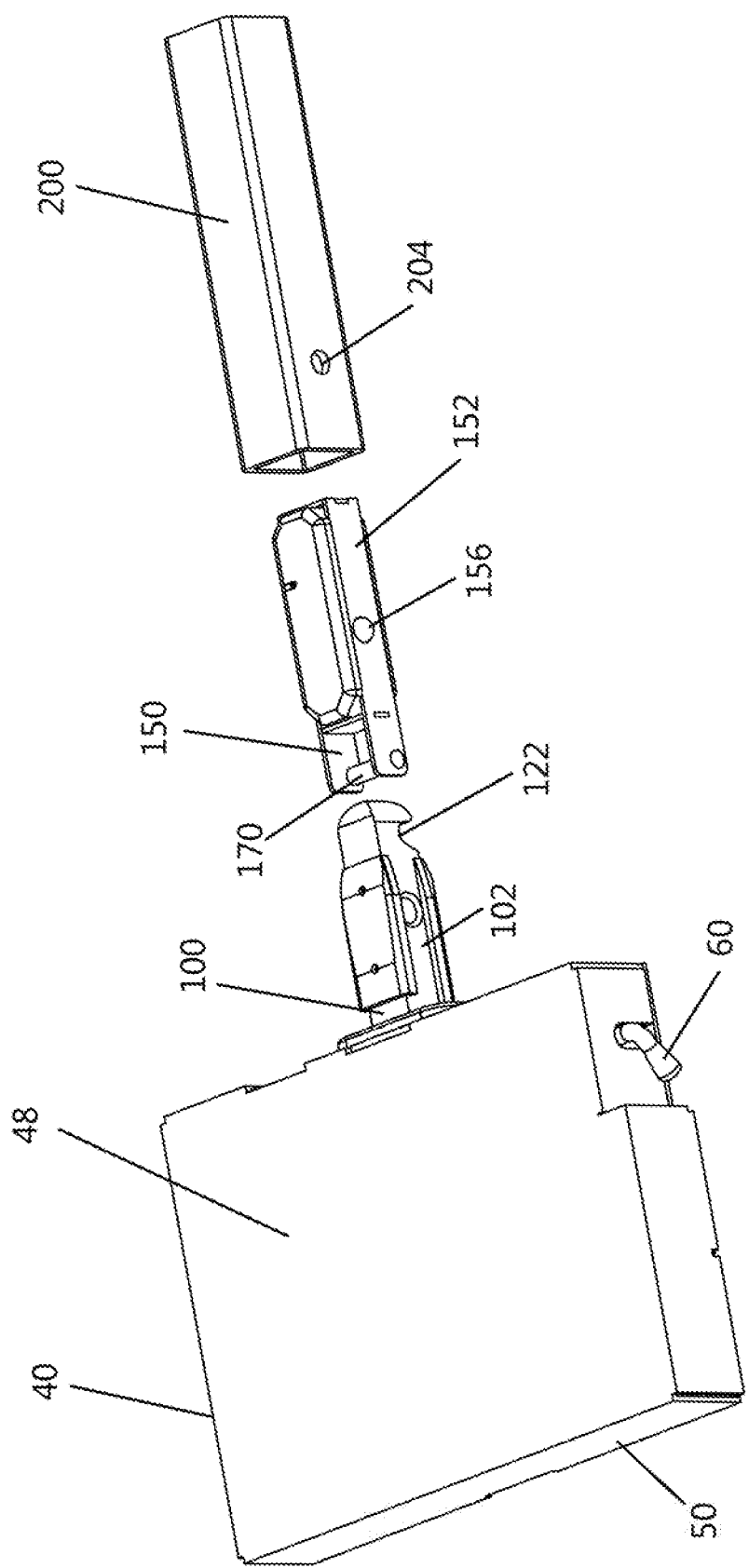
FIG. 2 is a left side perspective view of an apparatus for connecting a hand truck to the trailer hitch receiver of a vehicle in accordance with an embodiment of the present invention, showing the base, glide and receiver aligned but uncoupled.
Figure 3:
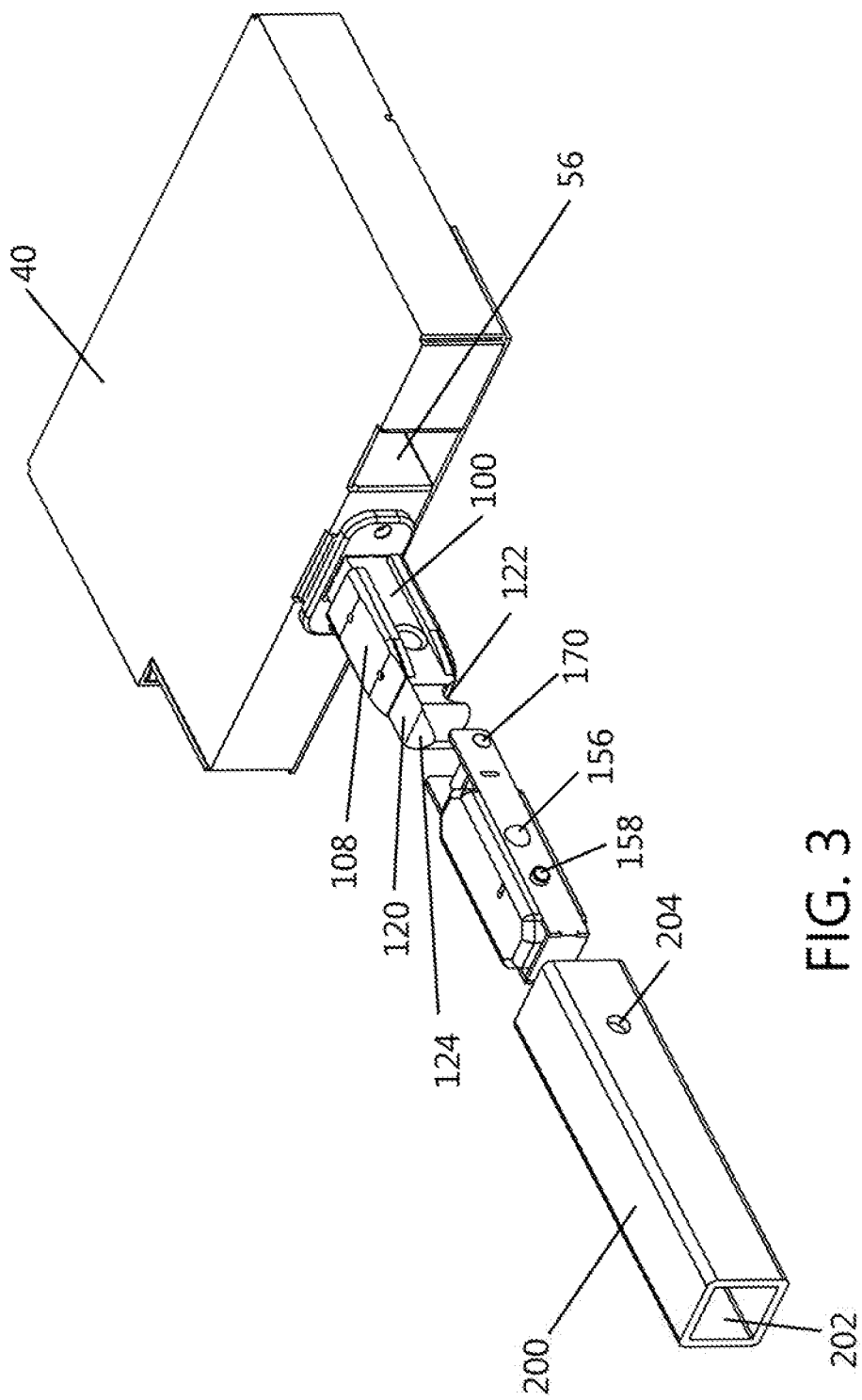
FIG. 3 is a right side perspective view of an apparatus for connecting a hand truck to the trailer hitch receiver of a vehicle in accordance with an embodiment of the present invention, showing the base, glide and receiver aligned but uncoupled.
Figure 4:
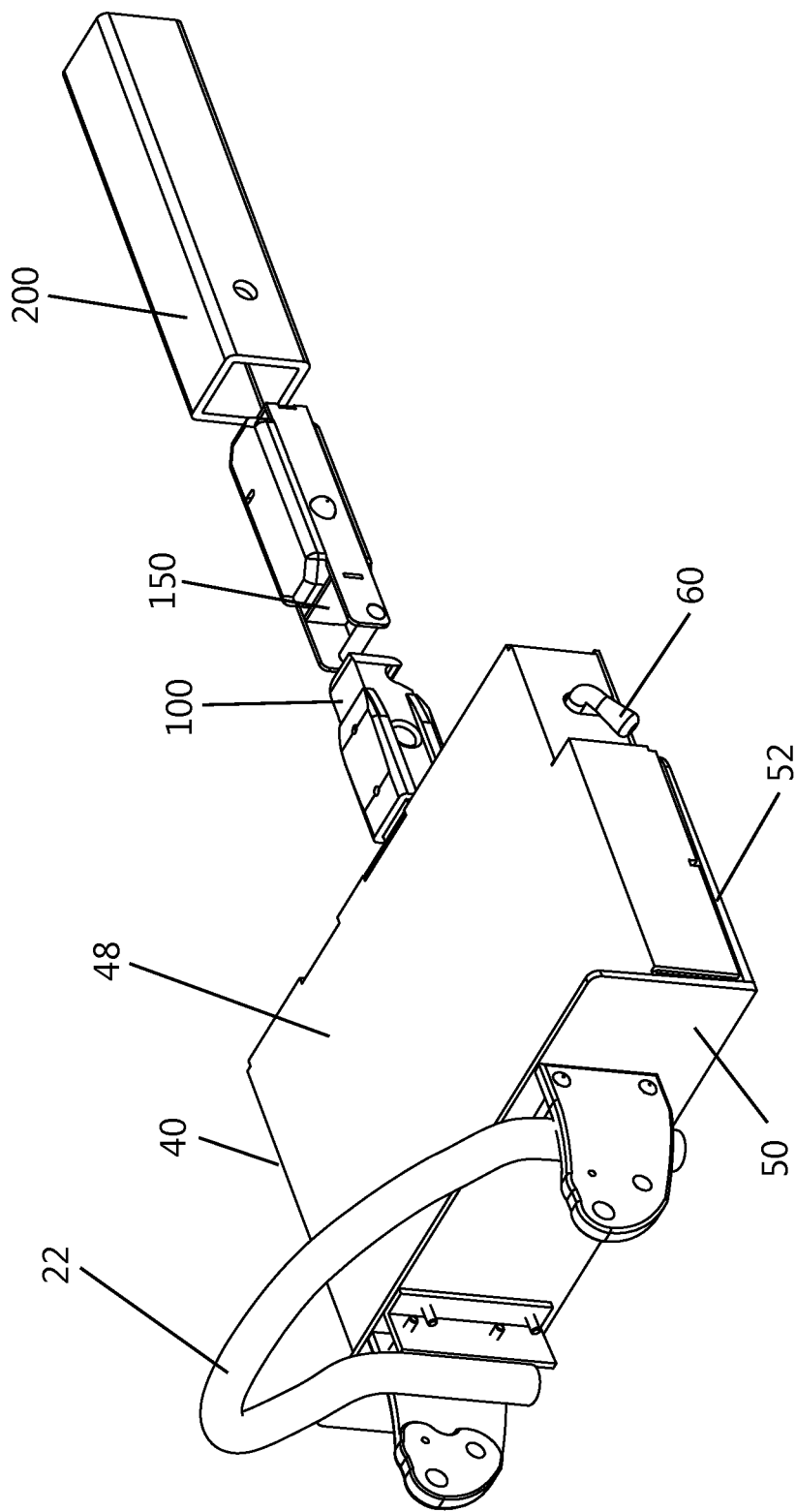
FIG. 4 is a left back perspective view of an apparatus for connecting a hand truck to the trailer hitch receiver of a vehicle in accordance with an embodiment of the present invention, showing the base, glide and receiver aligned but uncoupled and having a portion of a hand truck fixed to the base.
Figure 5:
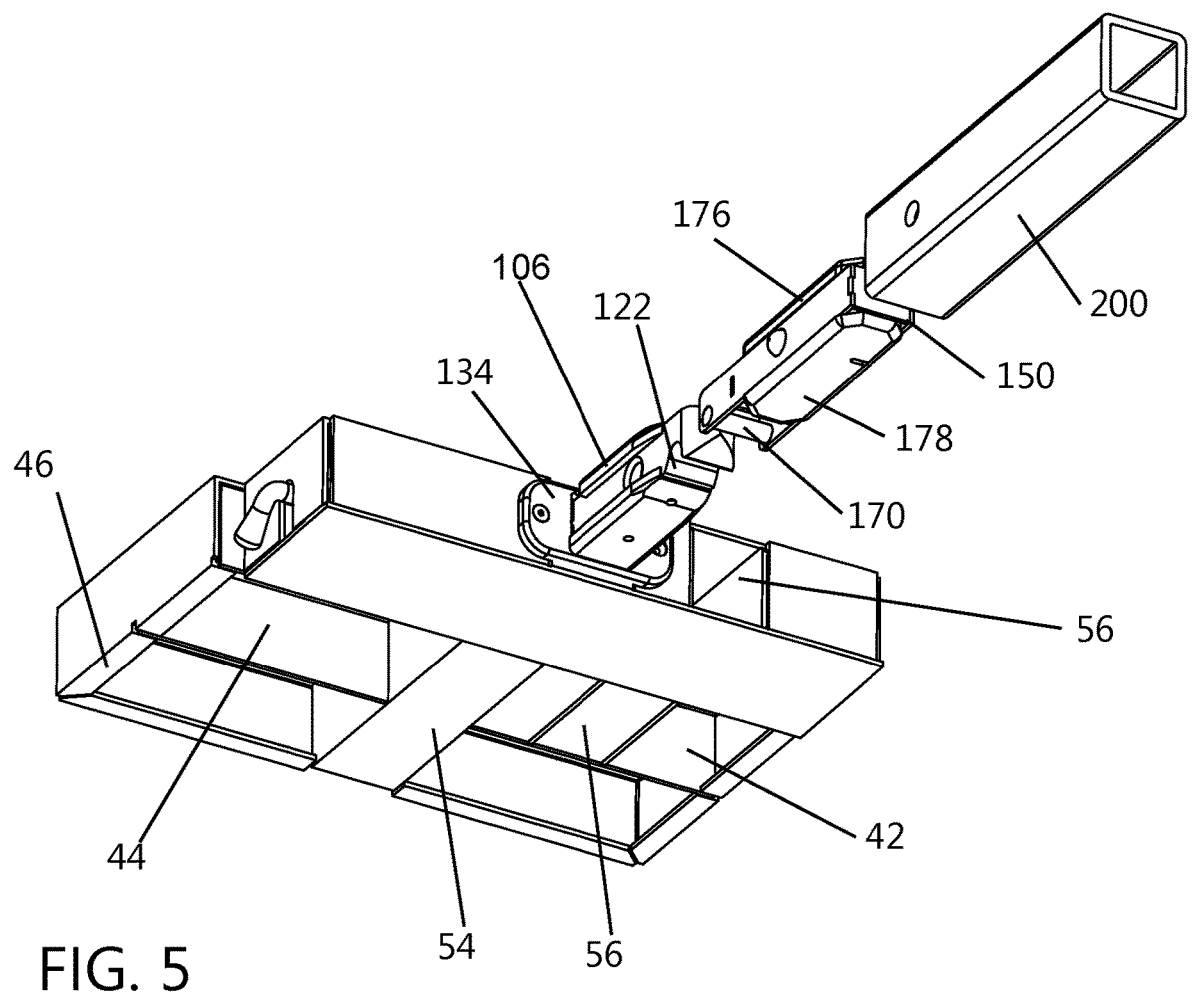
FIG. 5 is a bottom front perspective view of an apparatus for connecting a hand truck to the trailer hitch receiver of a vehicle in accordance with an embodiment of the present invention, showing the base, glide and receiver aligned but uncoupled.
Figure 6:
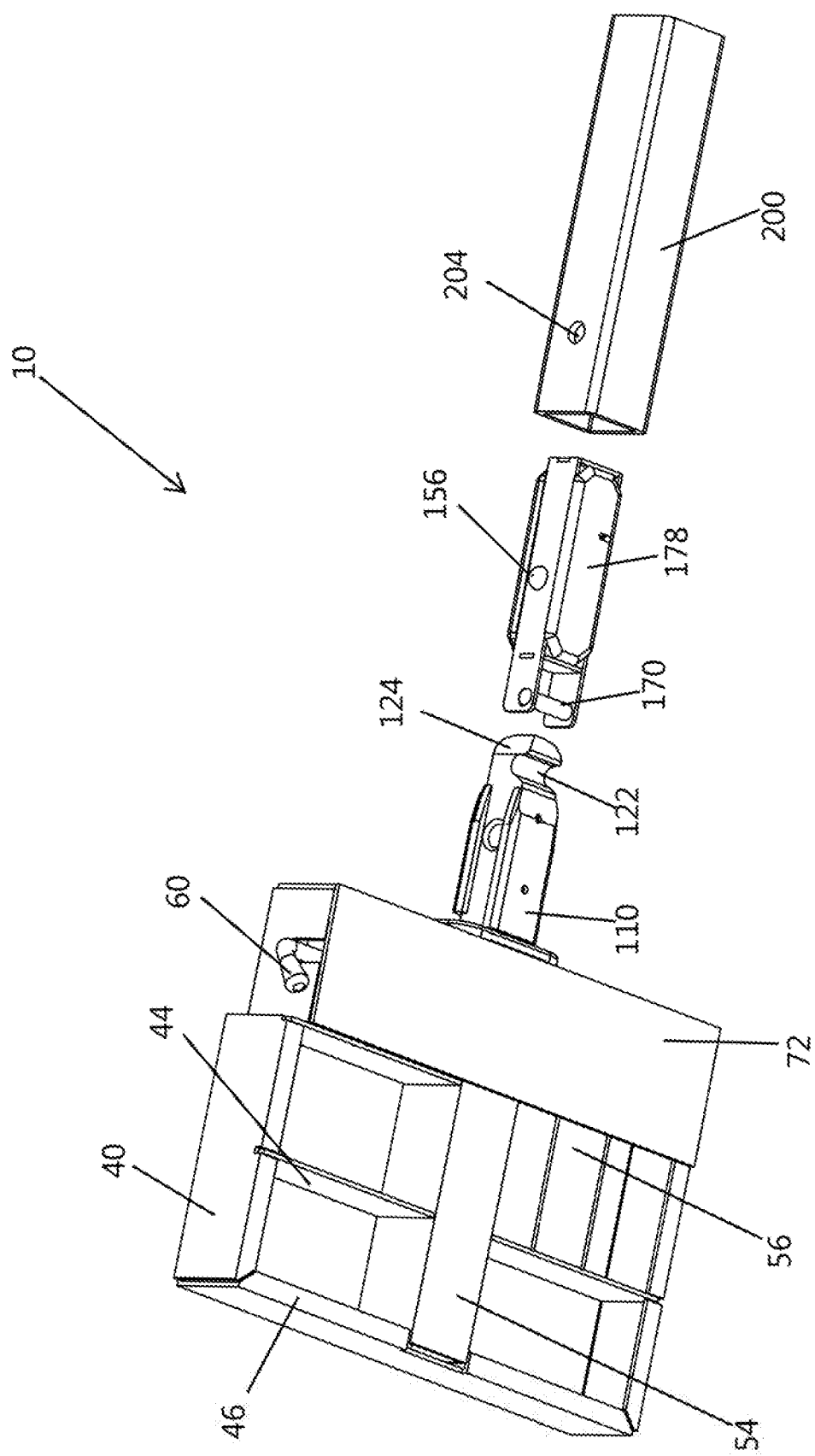
FIG. 6 is a bottom left side perspective view of an apparatus for connecting a hand truck to the trailer hitch receiver of a vehicle in accordance with an embodiment of the present invention, showing the base, glide and receiver aligned but uncoupled.
Figure 7:
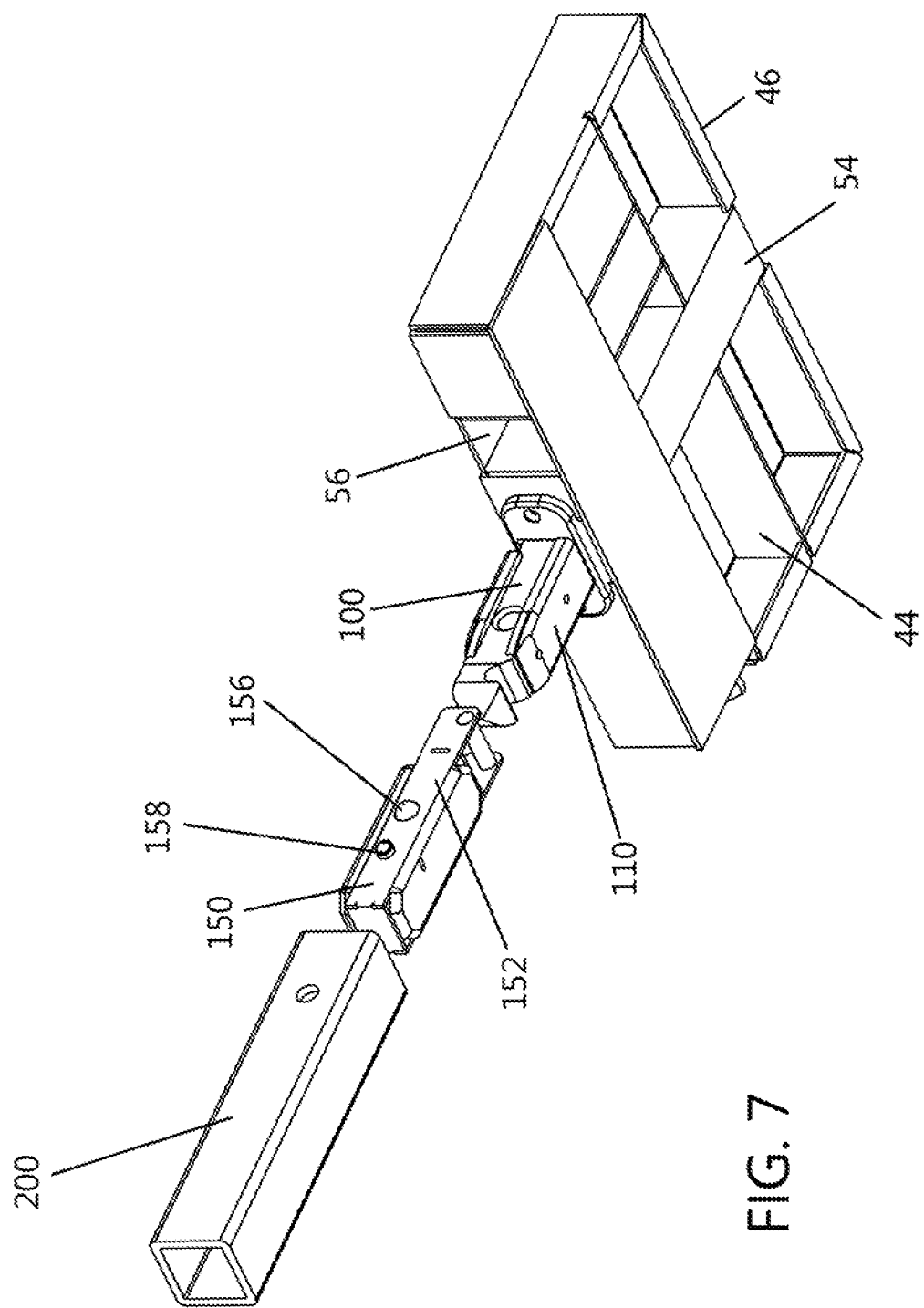
FIG. 7 is a bottom right side perspective view of an apparatus for connecting a hand truck to the trailer hitch receiver of a vehicle in accordance with an embodiment of the present invention, showing the base, glide and receiver aligned but uncoupled.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The hand truck vehicle mounting assembly 10 of the present invention is particularly well suited for externally coupling a hand truck or dolly to a receiver mounted to a vehicle. In some embodiments a vehicle's trailer hitch receiver or a trailer hitch receiver having an extended receiver is suitable for use with the invention. The present invention is further particularly well suited to allow a single user to couple a heavily loaded dolly to the vehicle hitch without requiring simple vertical lifting of the dolly to the height of the receiver. By way of example, a loaded dolly is tilted backward and then positioned so that a lever arm engages with a glide that is engaged with the vehicle hitch receiver. As the user rotates the dolly upward towards the vehicle, the glide slides into the receiver and the lever arm also slides into the receiver. The lever arm and glide of the present invention reduces the amount of lifting force required to lift the dolly to the height of the vehicle receiver.

Turning attention now to the Figures, embodiments according to aspects of the invention will now be described. Referring first to FIGS. 1-7, the hand truck vehicle mounting assembly 10 generally includes a base 40, lever arm 100, and glide 150 that may couple to a vehicle hitch receiver 200. In an embodiment of the invention the base has a hollow interior 42 with dividing walls 44 extending between the sides of the base to provide stability and support to the base. The top surface 48 of the base is particularly well suited for supporting a load. The bottom of the base includes an attachment flange 46 extending inward from the sidewalls. Base plate 52 may be coupled to the flange 46 with a weld, fasteners, or other known suitable coupling. The base plate may be further engaged and coupled to the tongue of the dolly or may form a portion of the tongue of the dolly. Further, a back side of the base 40 may include a backing plate 50 or, alternatively, a portion of the dolly may form or establish the back side of the base 40. The front side of the base includes an opening into a storage compartment 56 for the glide 150. Also internal to the base is a channel or tube 54 into which the lever arm 100 slides between a stowed position and extended position. Front extension stop 136 is formed on or coupled to lever arm 100. A blocker member 134 is attached to the front of the base at the opening of the channel or tube 54. The lever 100 is slidable through the blocker member 134 until the stop 136 contacts blocker 134. A rear extension stop 132 on the lever arm 100 inhibits the lever arm from being pulled completely out of the channel 54.

The lever arm 100 includes sides 102, side wear guides 106, top wear plate 108 and bottom wear plate 110. Free end 120 of the lever arm tapers to a nose 124. A claw 122 is formed on the lower portion of the free end 120 of the lever arm 100. Multiple hitch pin holes 130 extend from one side of the lever arm to the other. The multiple holes 130 allowing a user to orient the lever arm 100 relative to the base 40 and hitch receiver 200 in a variety of orientations. Independent glide 150 includes sidewalls 152, a hollow interior (not shown in the Figures), a compression release button 156 and a latch 158 (that is pushed out of the glide via spring 160). An end of the glide 150 includes a pivot pin 170 to which the claw 122 engages. The glide 150 further includes top wear plate 176 and bottom wear plate 178. In another suitable embodiment, the wear plates may be eliminated by making the glide 150 from a solid wear resistant core (such as nylon) and having side plates and the pivot pin mounted to the core.

The wear plates 106, 108, 110, 176 and 178 may be constructed from a variety of known materials having wear resistant characteristics when sliding against metal and further having coefficients of friction that are lower than a metal surface. One such known suitable material is a carbon fiber filled nylon. The hitch receiver 200 includes tubular sidewalls 202 and a hitch pin hole 204 extending through both sides of the sidewalls 202. Throughout many of the Figures a ground or surface level is identified with numeral 16 and the vehicle or addition portions of the vehicle receiver frame are identified with dashed lines and numeral 230. Additionally, the orientation of the base relative to the ground 16 and height of the receiver 200 relative to the ground 16 are depicted in several of the Figures.

Figure 8:
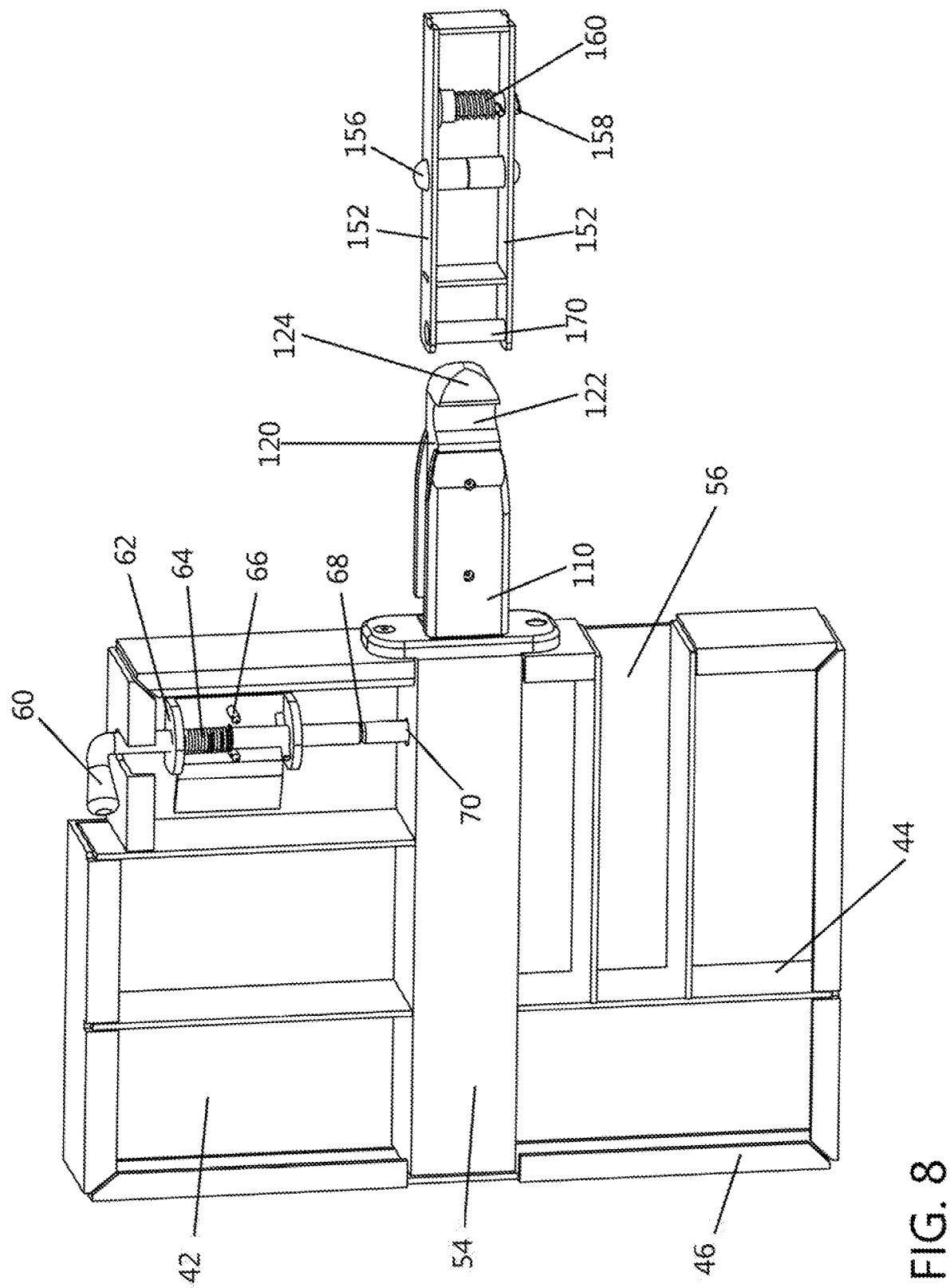
FIG. 8 is a partial section bottom perspective view of an apparatus for connecting a hand truck to the trailer hitch receiver of a vehicle in accordance with an embodiment of the present invention, showing the base and glide aligned but uncoupled.
Figure 9:
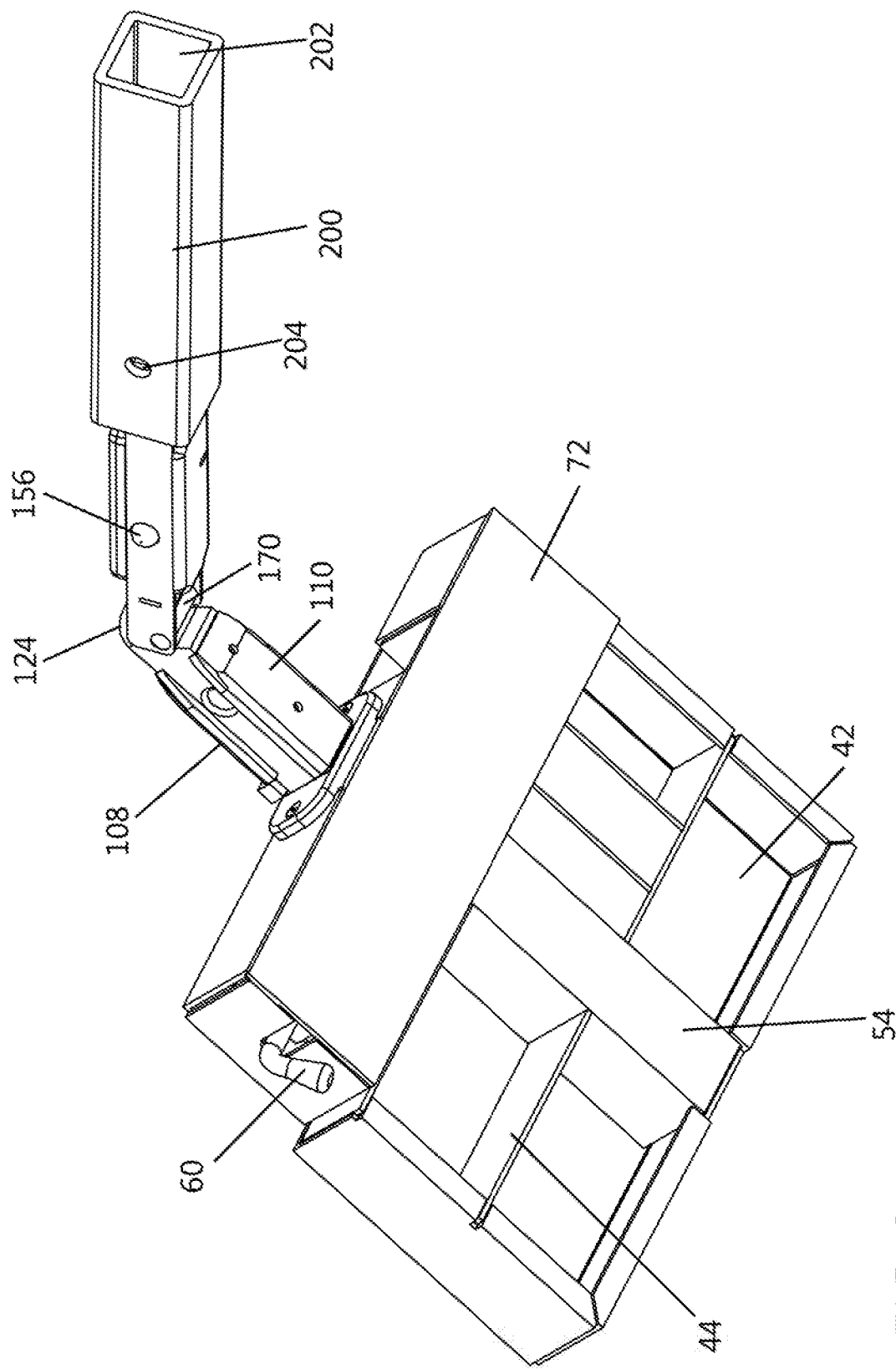
FIG. 9 is a bottom perspective view of an apparatus for connecting a hand truck to the trailer hitch receiver of a vehicle in accordance with an embodiment of the present invention, showing the base tilted and coupled to the glide and showing the glide aligned but uncoupled to the receiver.
Figure 10:
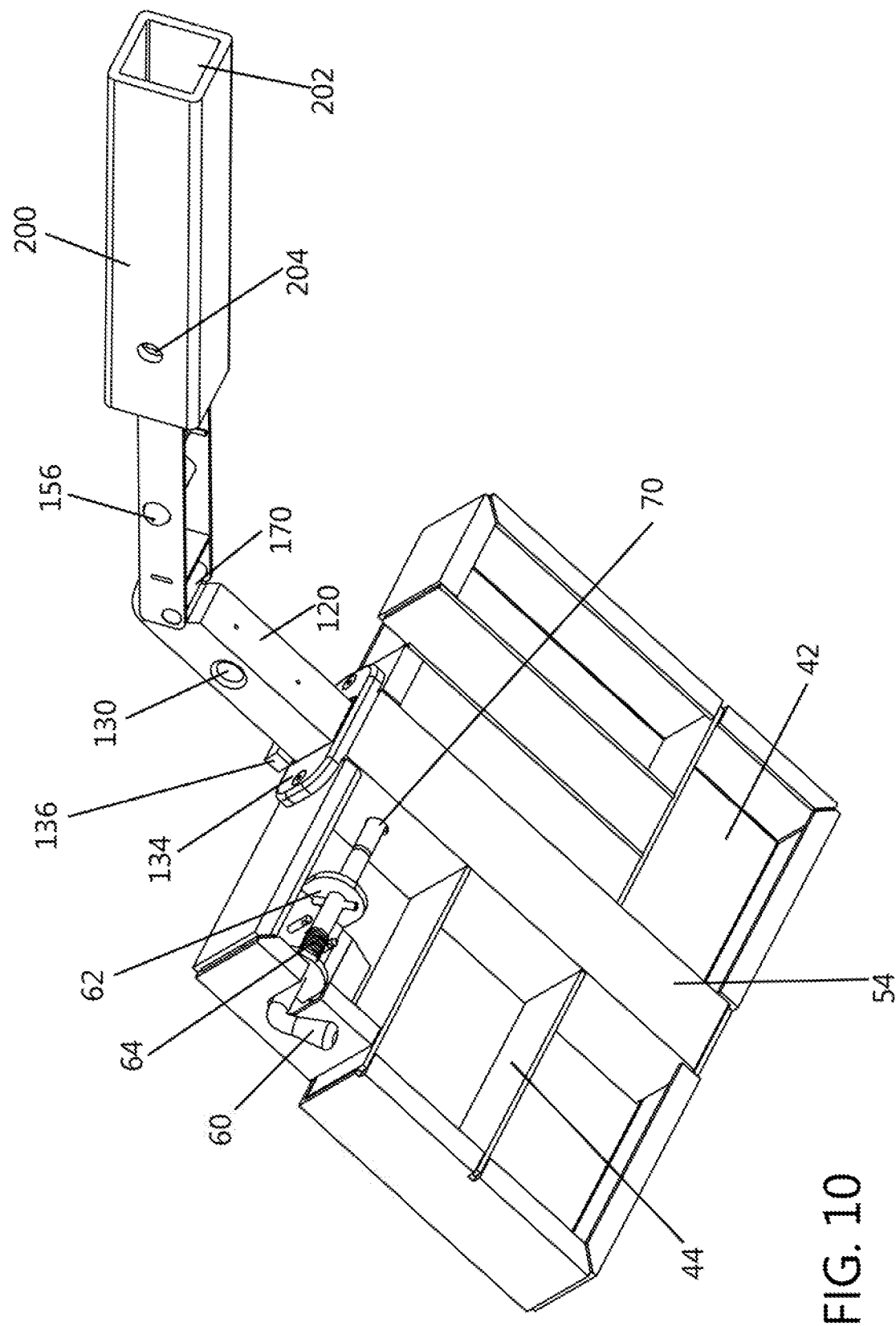
FIG. 10 is a partial sectional bottom perspective view of an apparatus for connecting a hand truck to the trailer hitch receiver of a vehicle of the type shown in FIG. 9, showing the base tilted and coupled to the glide and showing the glide aligned but uncoupled to the receiver.
Figure 11:
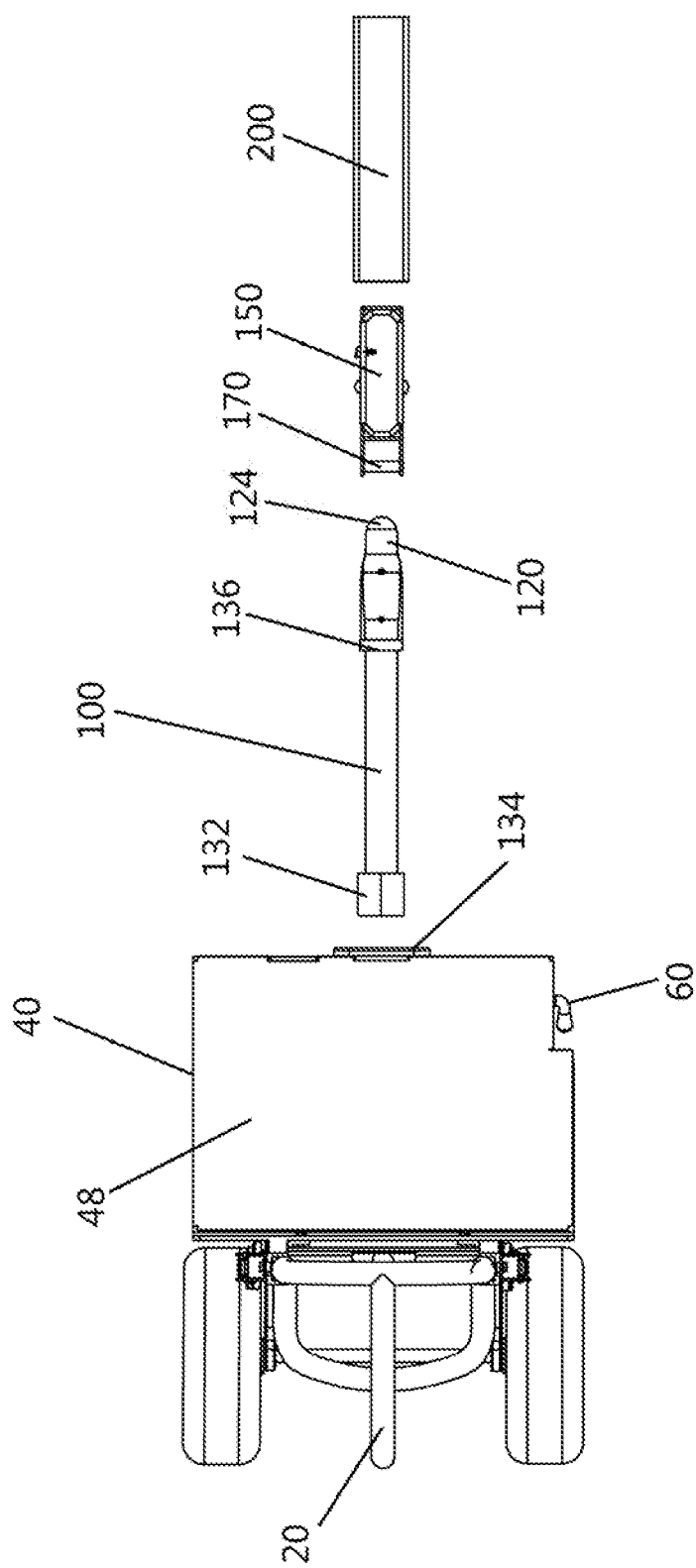
FIG. 11 is a partial exploded top plan view of an apparatus in accordance with an embodiment of the present invention illustrating a hand cart coupled to a base and aligned with a lever arm, glide and receiver in accordance with aspects of the invention.
Figure 12:
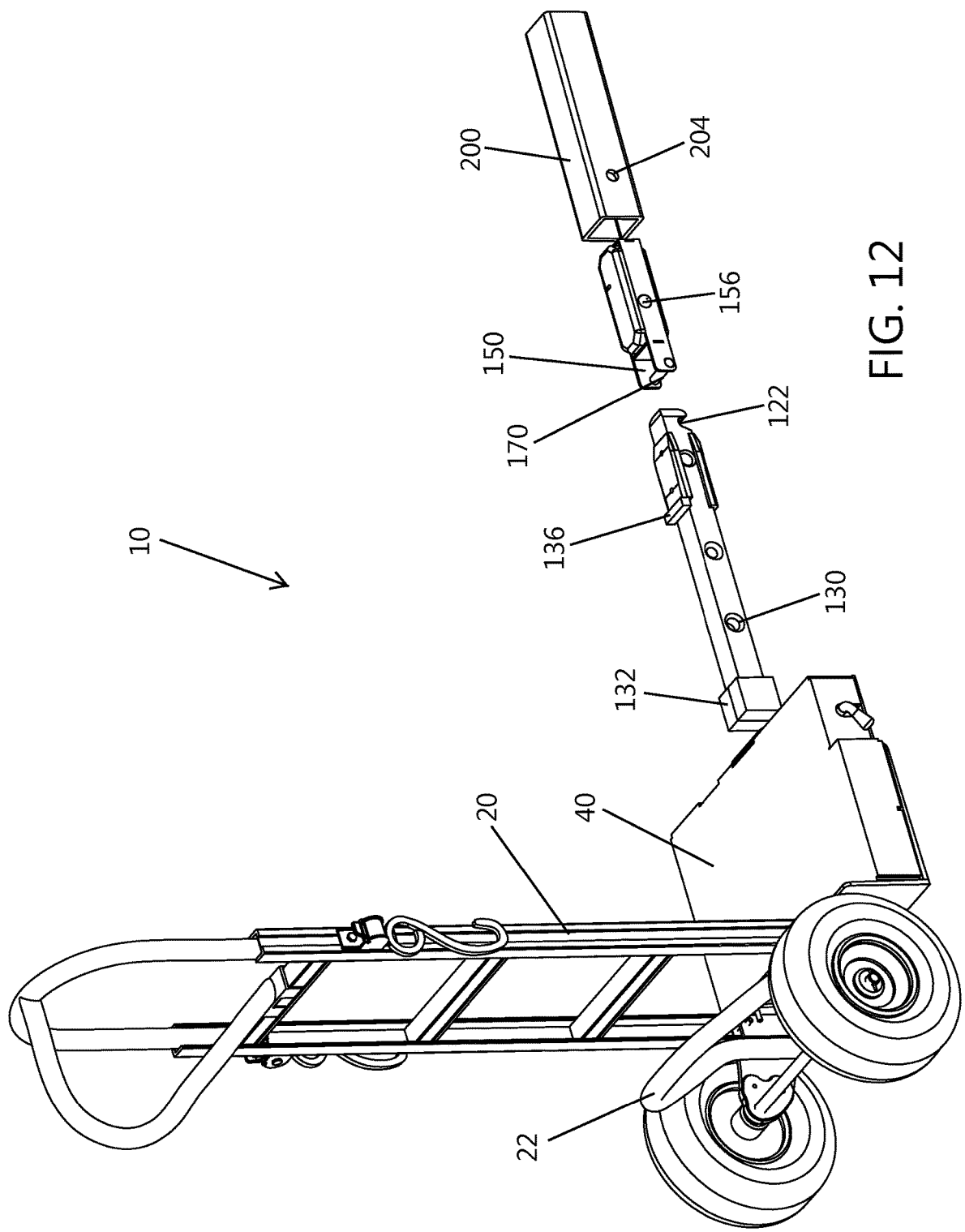
FIG. 12 is a partial exploded side perspective view of an apparatus in accordance with an embodiment of the present invention illustrating a hand cart coupled to a base and aligned with a lever arm, glide and receiver in accordance with aspects of the invention.
Figure 13:
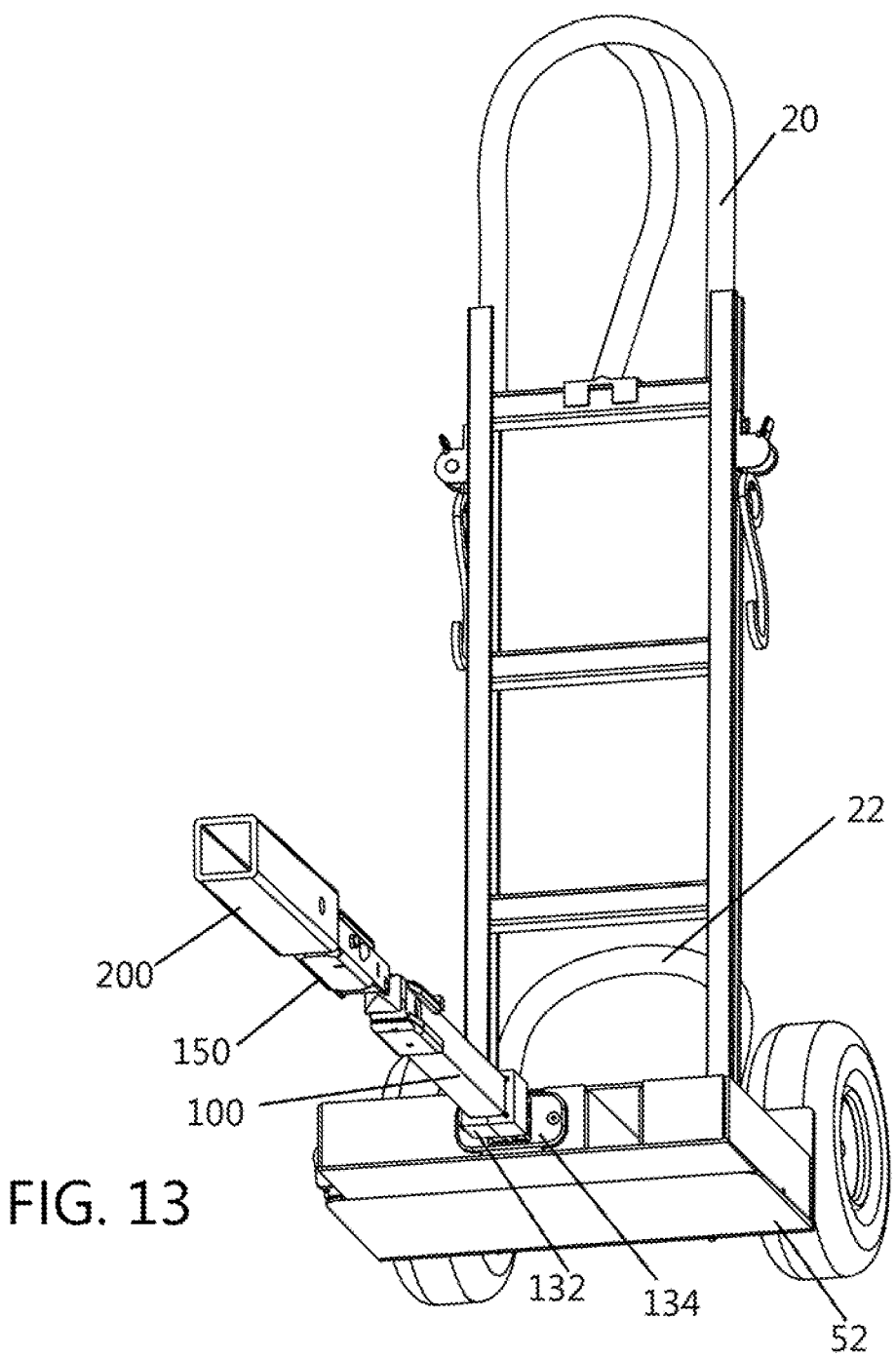
FIG. 13 is a partial exploded front bottom perspective view of an apparatus in accordance with an embodiment of the present invention illustrating a hand cart coupled to a base and aligned with a lever arm, glide and receiver in accordance with aspects of the invention.
Figure 14:
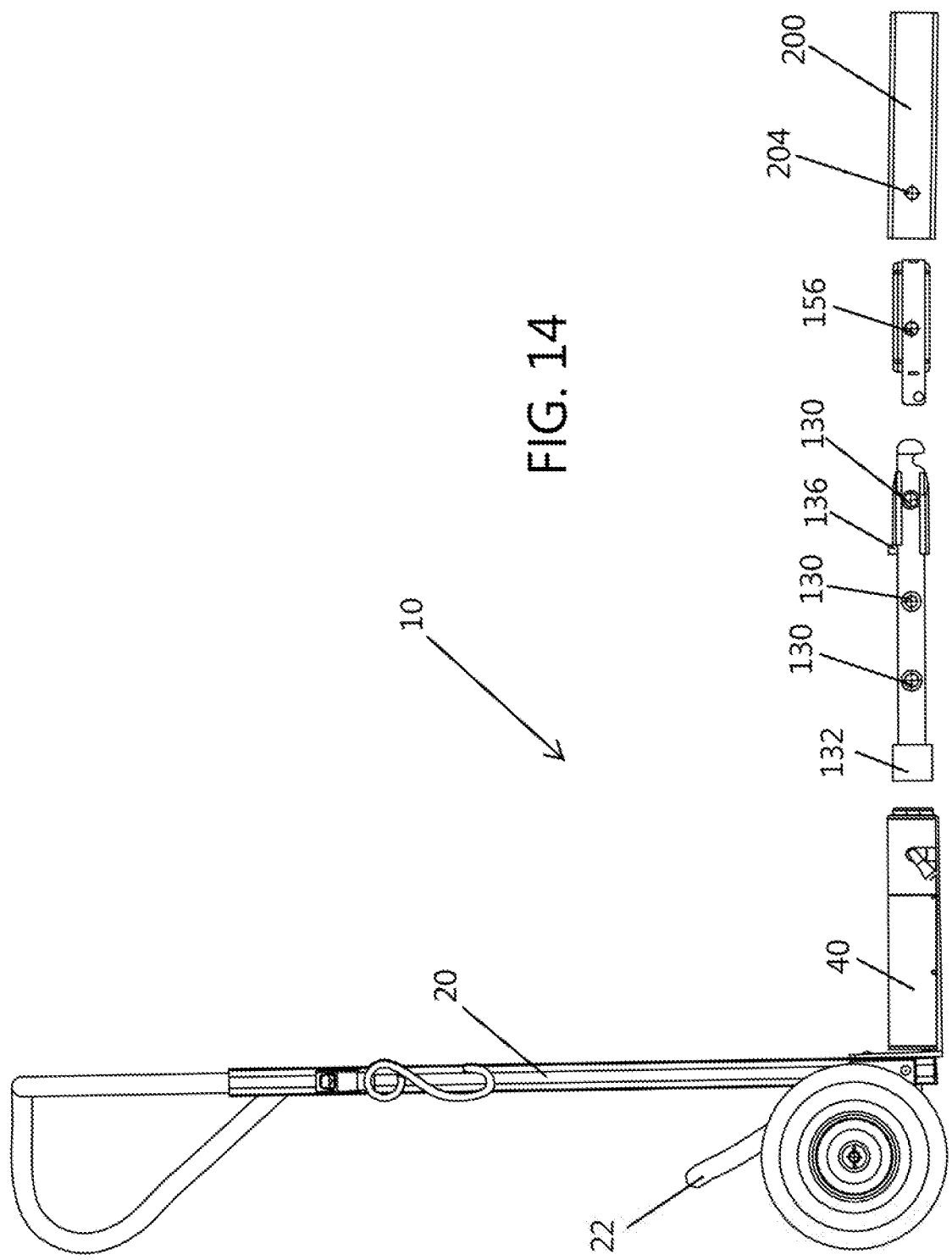
FIG. 14 is a partial exploded side view of an apparatus in accordance with an embodiment of the present invention illustrating a hand cart coupled to a base and aligned with a lever arm, glide and receiver in accordance with aspects of the invention.
Figure 15:
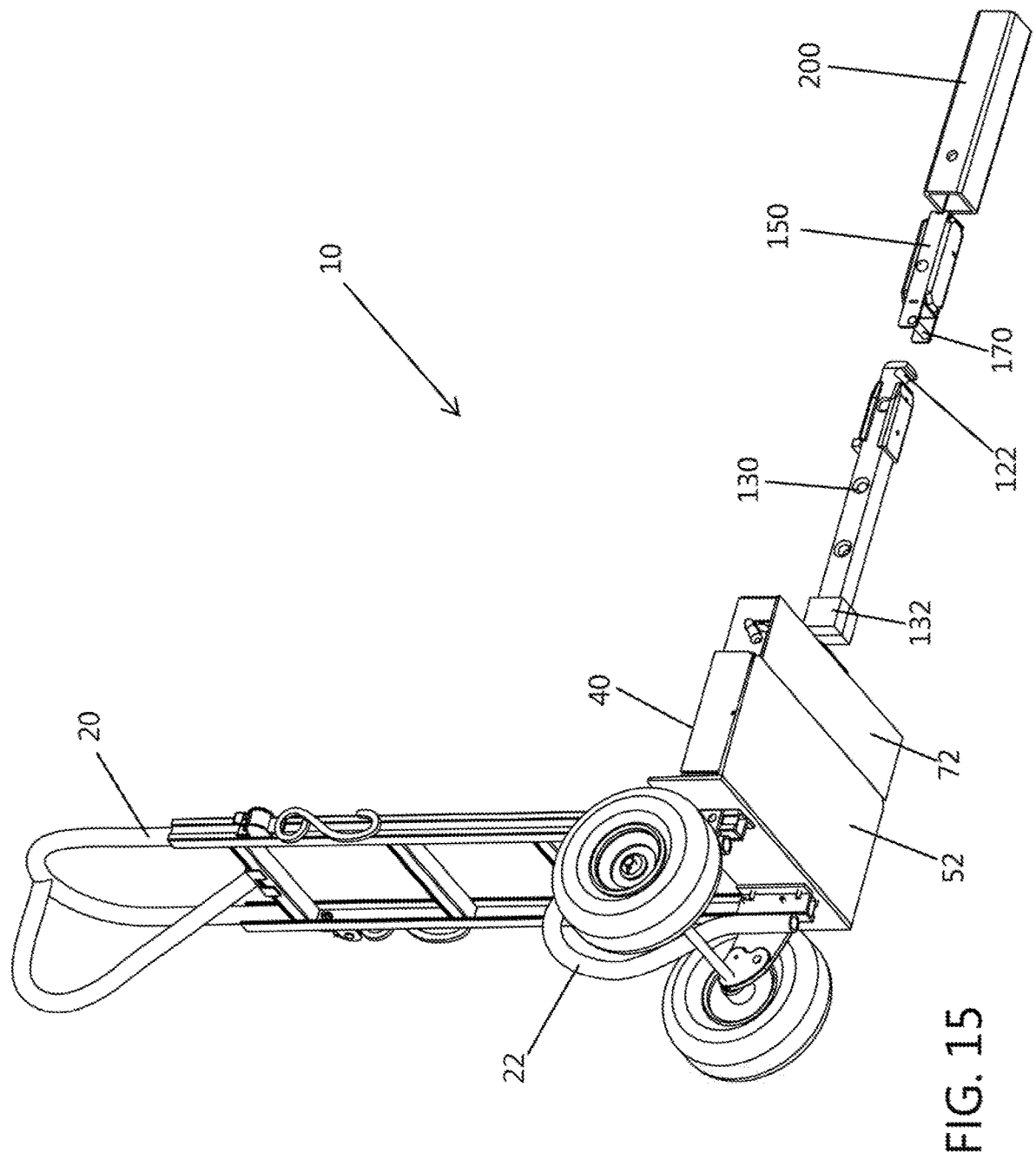
FIG. 15 is a partial exploded bottom side perspective view of an apparatus in accordance with an embodiment of the present invention illustrating a hand cart coupled to a base and aligned with a lever arm, glide and receiver in accordance with aspects of the invention.
Figure 16:
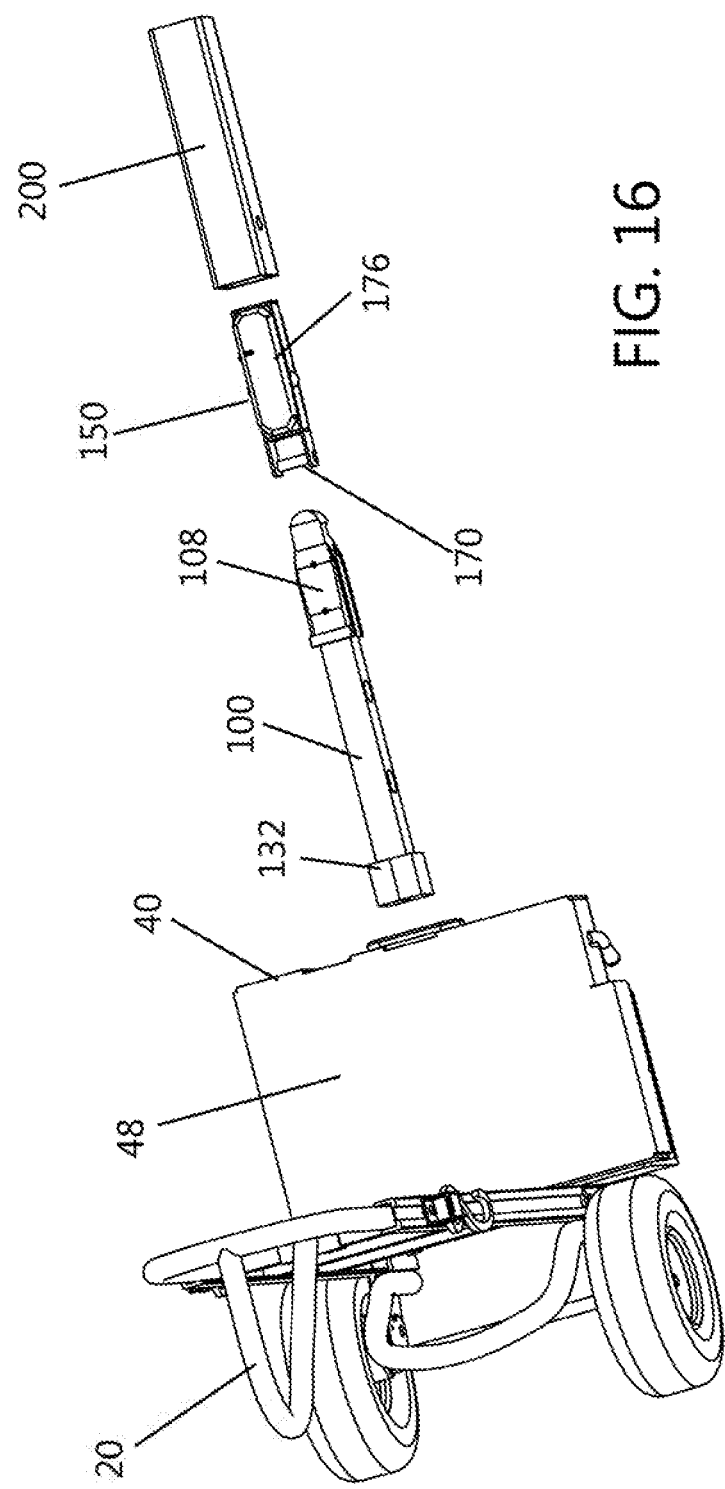
FIG. 16 is a partial exploded top side perspective view of an apparatus in accordance with an embodiment of the present invention illustrating a hand cart coupled to a base and aligned with a lever arm, glide and receiver in accordance with aspects of the invention.
Figure 17:
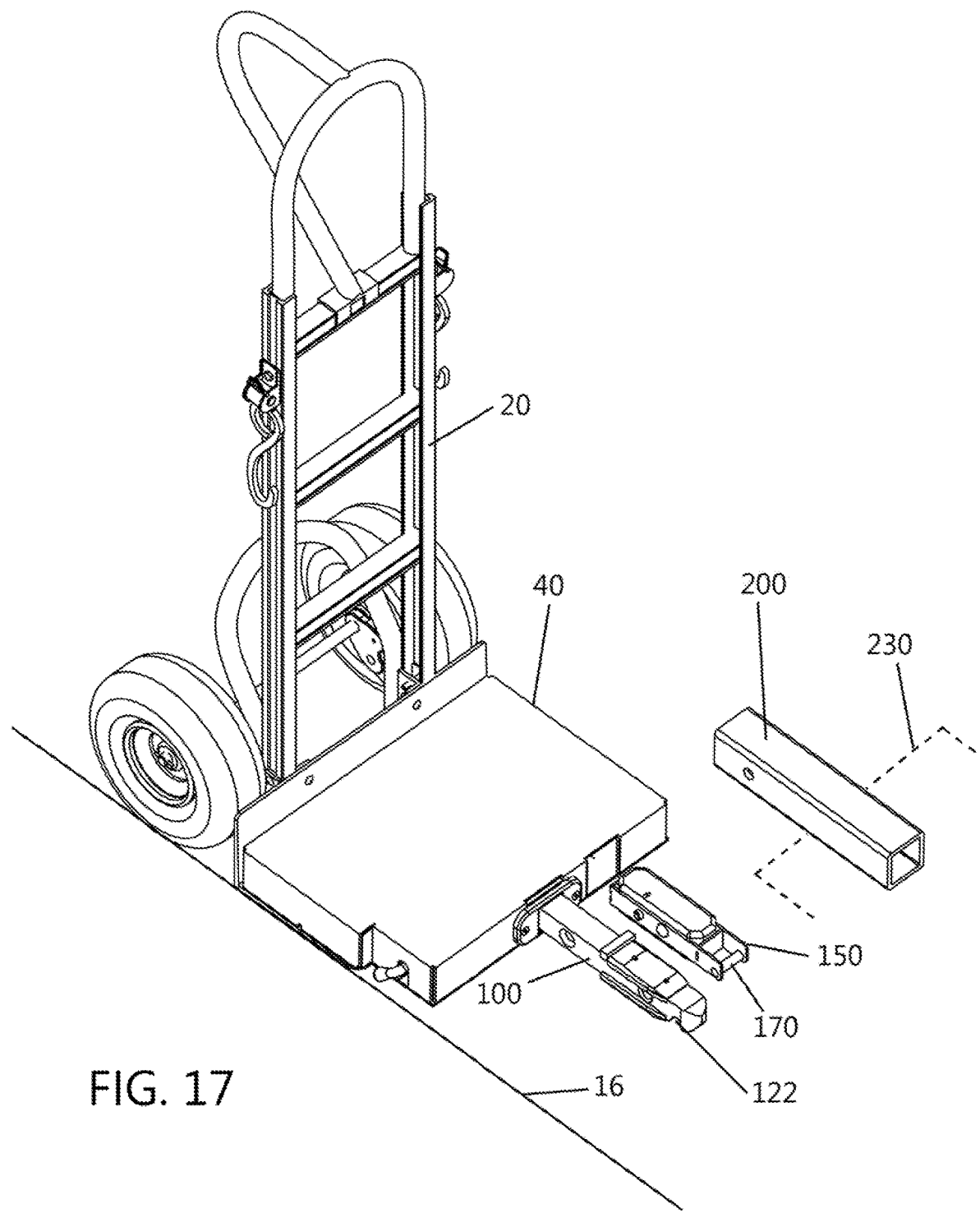
FIG. 17 is a perspective view of a hand-truck and lift device in accordance with an embodiment of the present invention shown in a pre load position.

Referring next to FIGS. 8-10, lock pin 60 is mounted in base 40 with mounts 62. Lock pin 60 is able to slide back and forth through the mounts 62. An end of the pin 60 extends through lock pin hole 70 formed in the lever arm channel or tube 54 of the base 40. The end of the pin 70 engages and disengages within holes 130 extending through lever arm 100. Stop 66 retains spring 64 which returns the lock to the locked position. Groove 68 extends around the lock pin and may be utilized to temporarily restrict the lock pin in a disengaged position. Lock pin cover or plate 72 is mounted or fastened to the bottom flange 46 of the base 40 to enclose the lock mechanism.

FIGS. 11-16 illustrates a linear alignment of the lever arm channel or tube 54 of the base 40, the lever arm 100, the glide 150 and the vehicle hitch 200. The lever arm 100 is shown completely removed from the base to further illustrate components of the lever arm 100 that are contained within the base 40. A portion of the lever arm 100 slides within and is contained by the lever arm channel or tube 54. When the lever arm is installed within the lever arm channel 54, a stop 132 having a perimeter larger than a perimeter of the hole extending through the blocker 134 restricts the lever arm from being removed completely from the channel. The blocker 134 may be attached to or formed as a part of the base 40. A front extension stop prevents or restricts the lever arm from sliding into the base further than where the stop 136 is positioned on the lever arm 100. Although two holes 130 are shown extending through the lever arm between the rear extension stop 132 and the front extension stop 136, those skilled in the art will appreciate that if desired more holes may be created in the lever arm. The holes 130 between the two stop are utilized in conjunction with the lock pin 60 to lock the lever arm into position having a desired length extending from the base. When two holes 130 are provided between the stops, the rearward hole may be utilized to lock the lever arm 100 in the extended or loading position and the forward hole 130 may be utilized to lock the lever arm in the retracted or travelling position. The hole 130 near the free end 120 of the lever arm 100 may be aligned with the hitch pin hole 204 of the hitch receiver 200. In this manner a hitch pin may be utilized to lock the lever arm 100 to the receiver 200.

Figure 18:
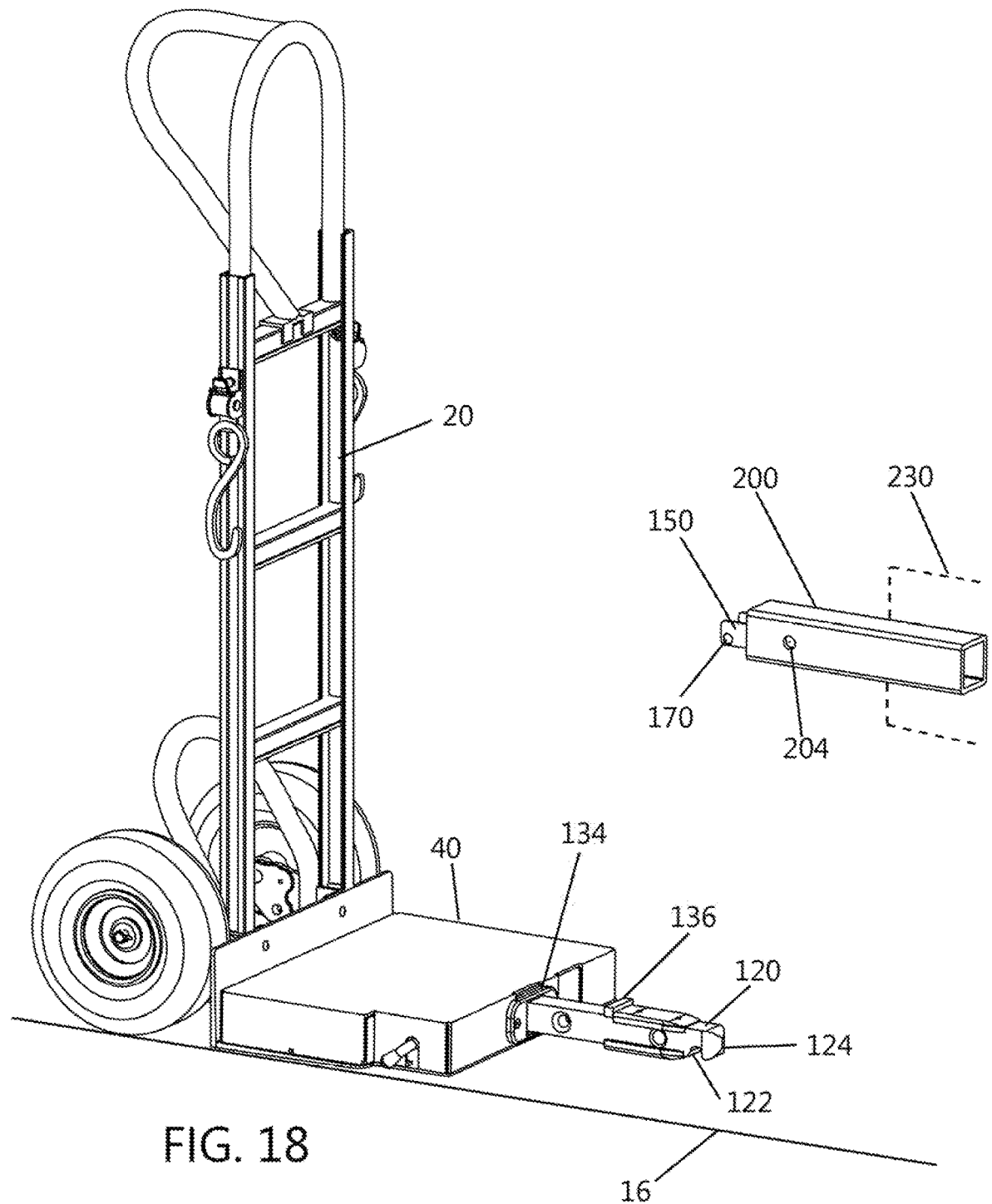
FIG. 18 is a perspective view of the hand-truck and loading device of the type shown in FIG. 17 with the receiver glide inserted into the receiver.
Figure 19:
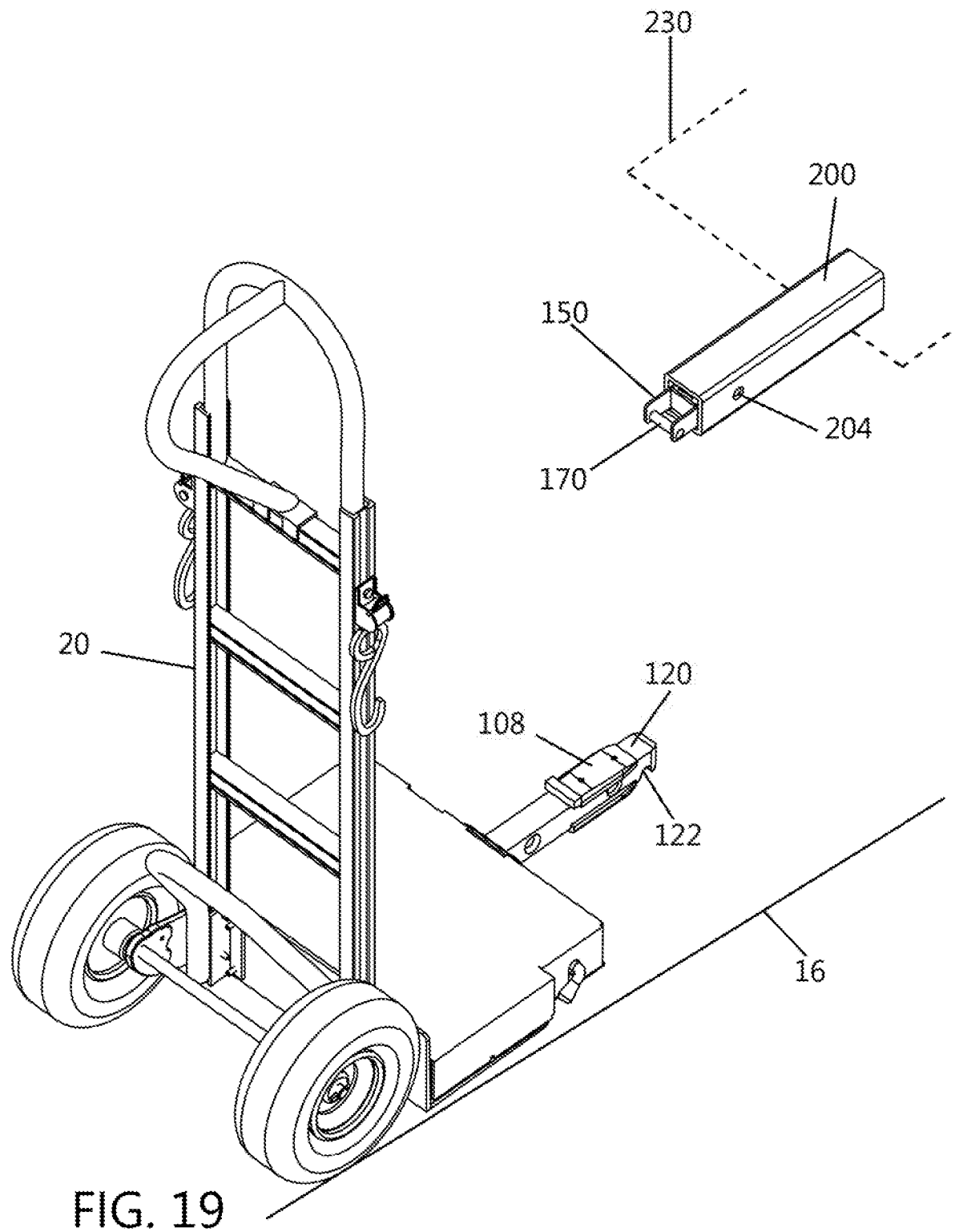
FIG. 19 is a rear perspective view of the hand truck and loading device of the type shown in FIG. 18.
Figure 20:
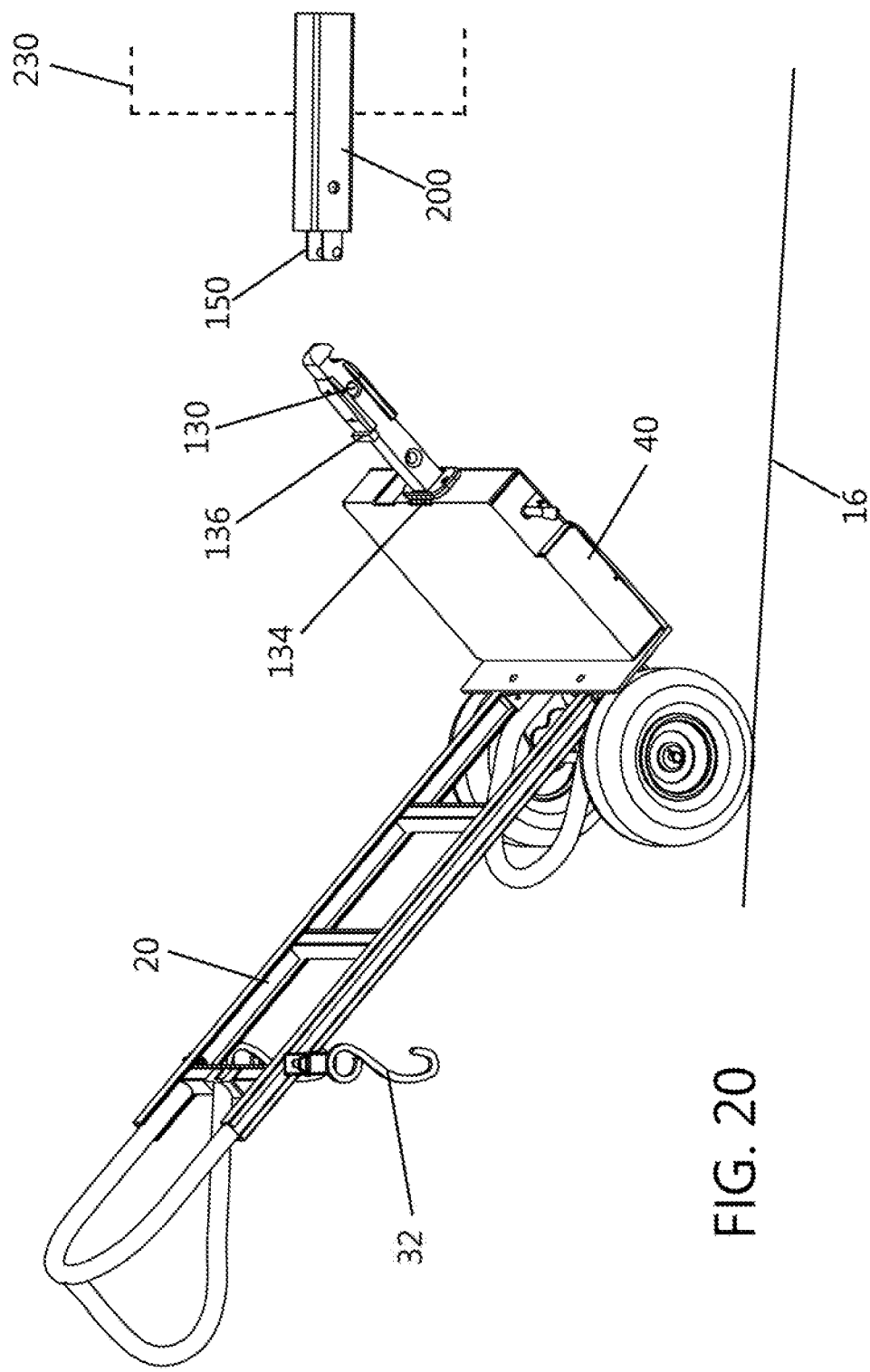
FIG. 20 is a perspective view of the hand truck of the type shown in FIG. 18 and illustrated as tilting back at an approximately 40° angle in preparation to attach the lever arm or shaft to the glide or receiver glide.
Figure 21:
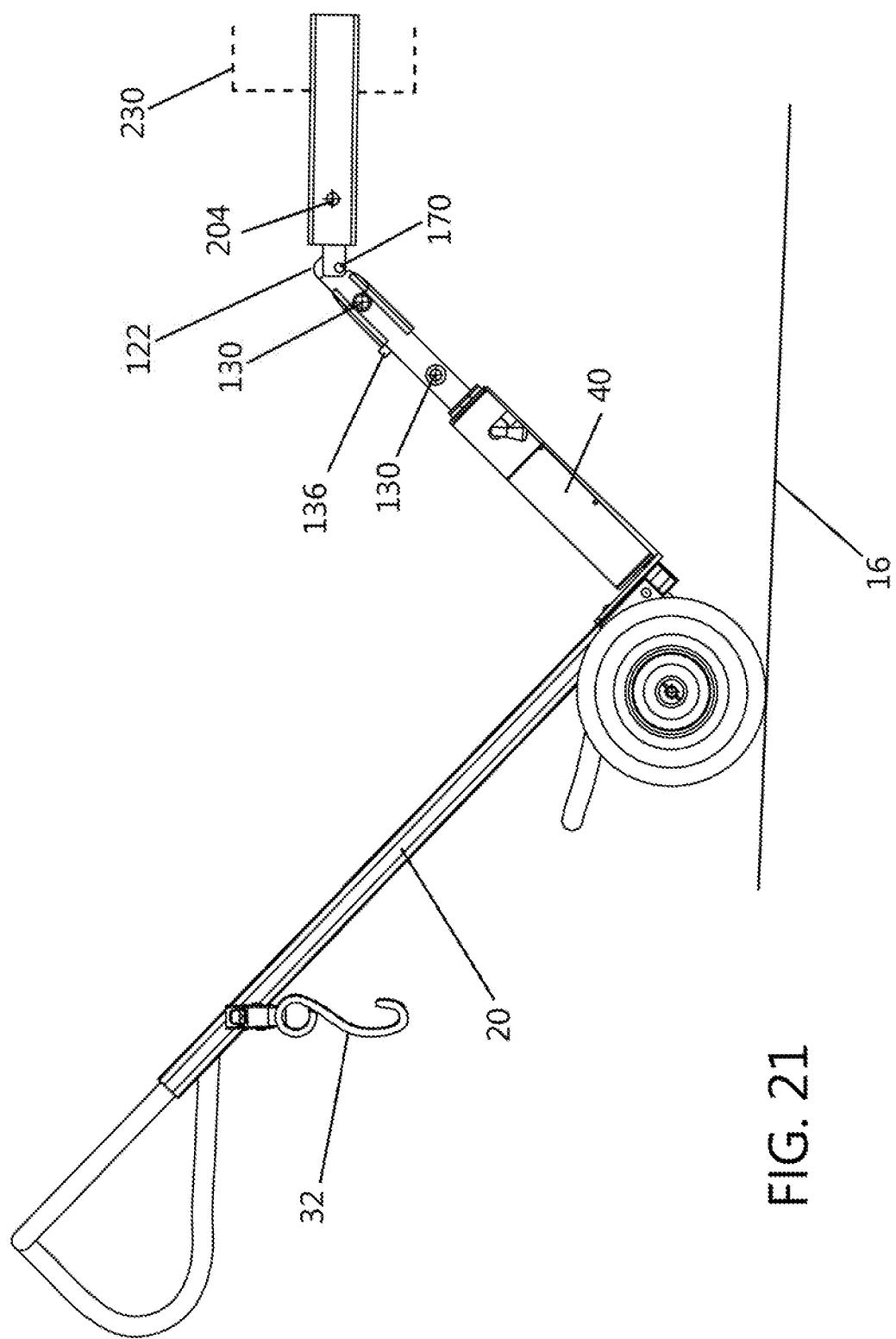
FIG. 21 is a side perspective view of the hand truck base of the type illustrated in FIG. 20 and shown tilted back and attached or coupled to the glide device.
Figure 22:
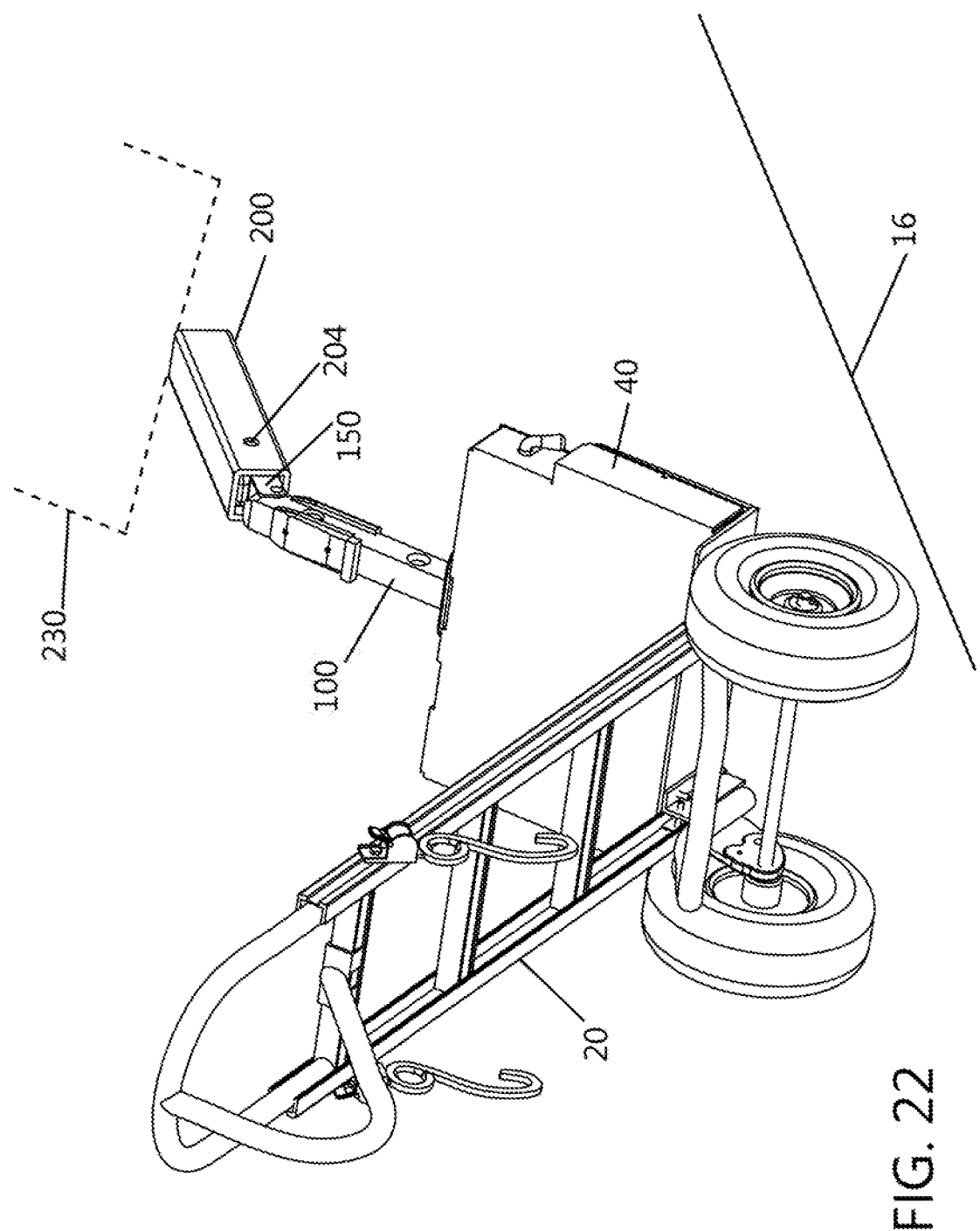
FIG. 22 is a rear perspective view of the hand truck of the type illustrated in FIG. 21.
Figure 23:
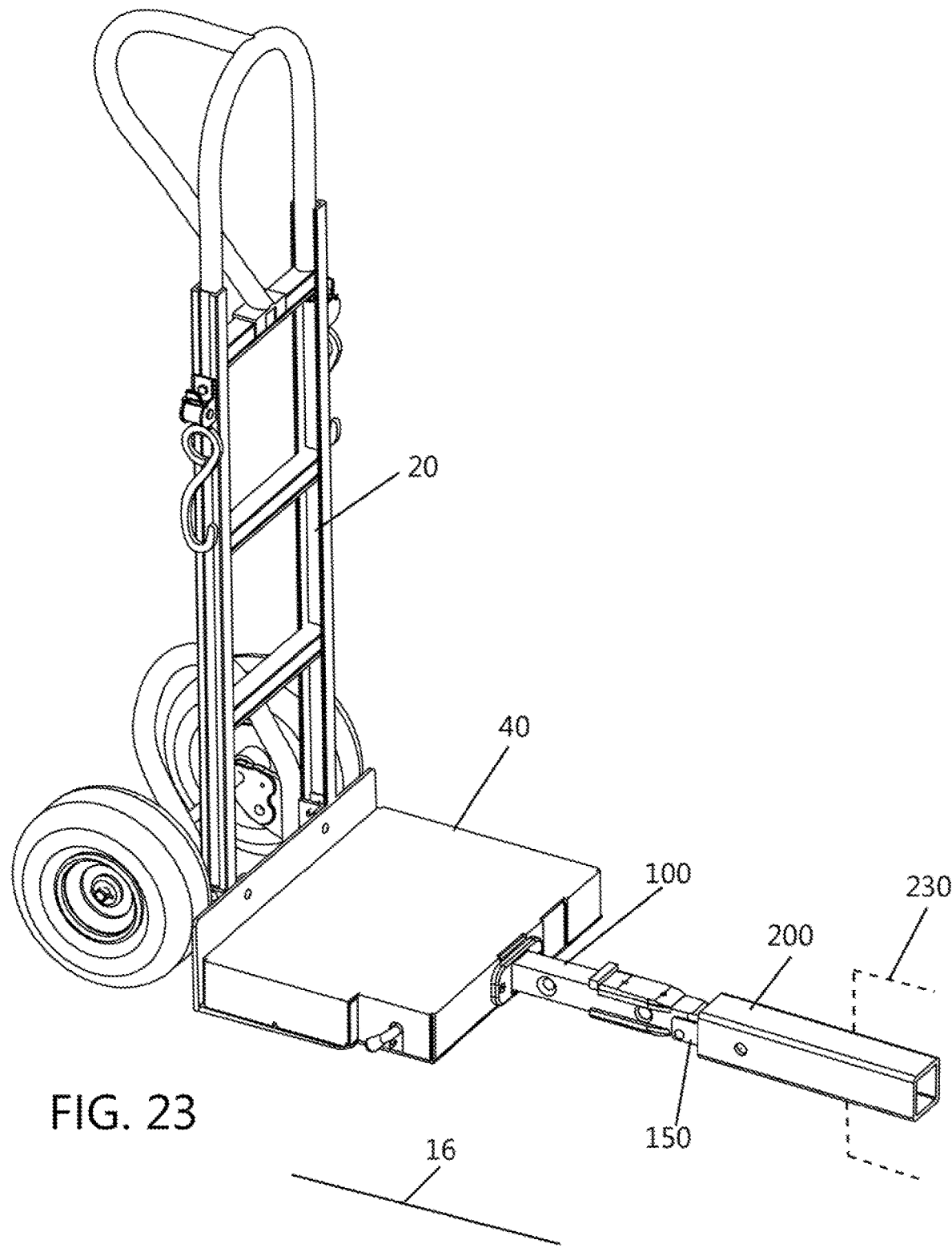
FIG. 23 is a perspective view of the hand truck, base and lever arm in accordance with the present invention and shown lifted up to the same height or level as the receiver.
Figure 24:
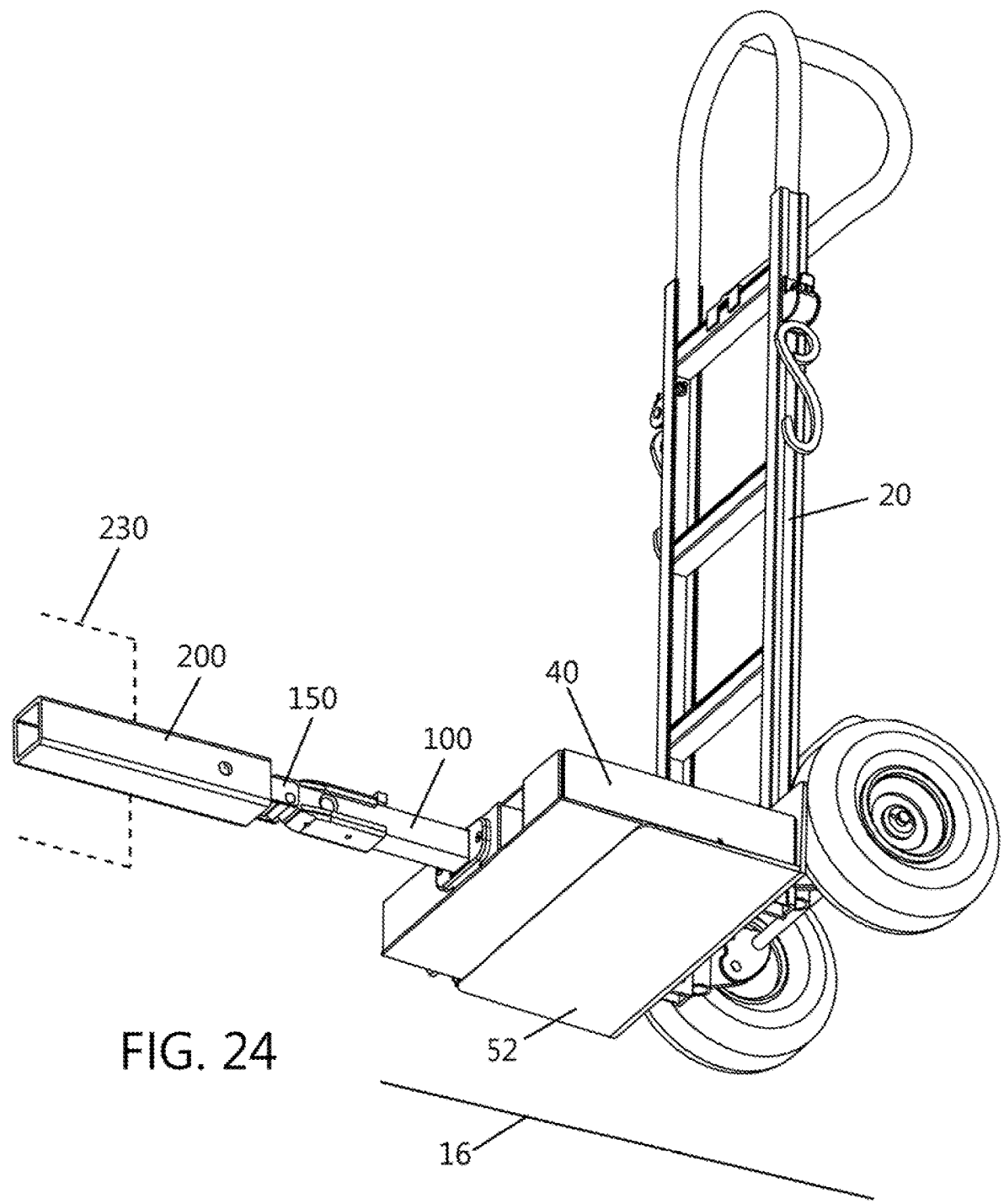
FIG. 24 is a bottom perspective view of the invention of the type illustrated in FIG. 23.
Figure 25:
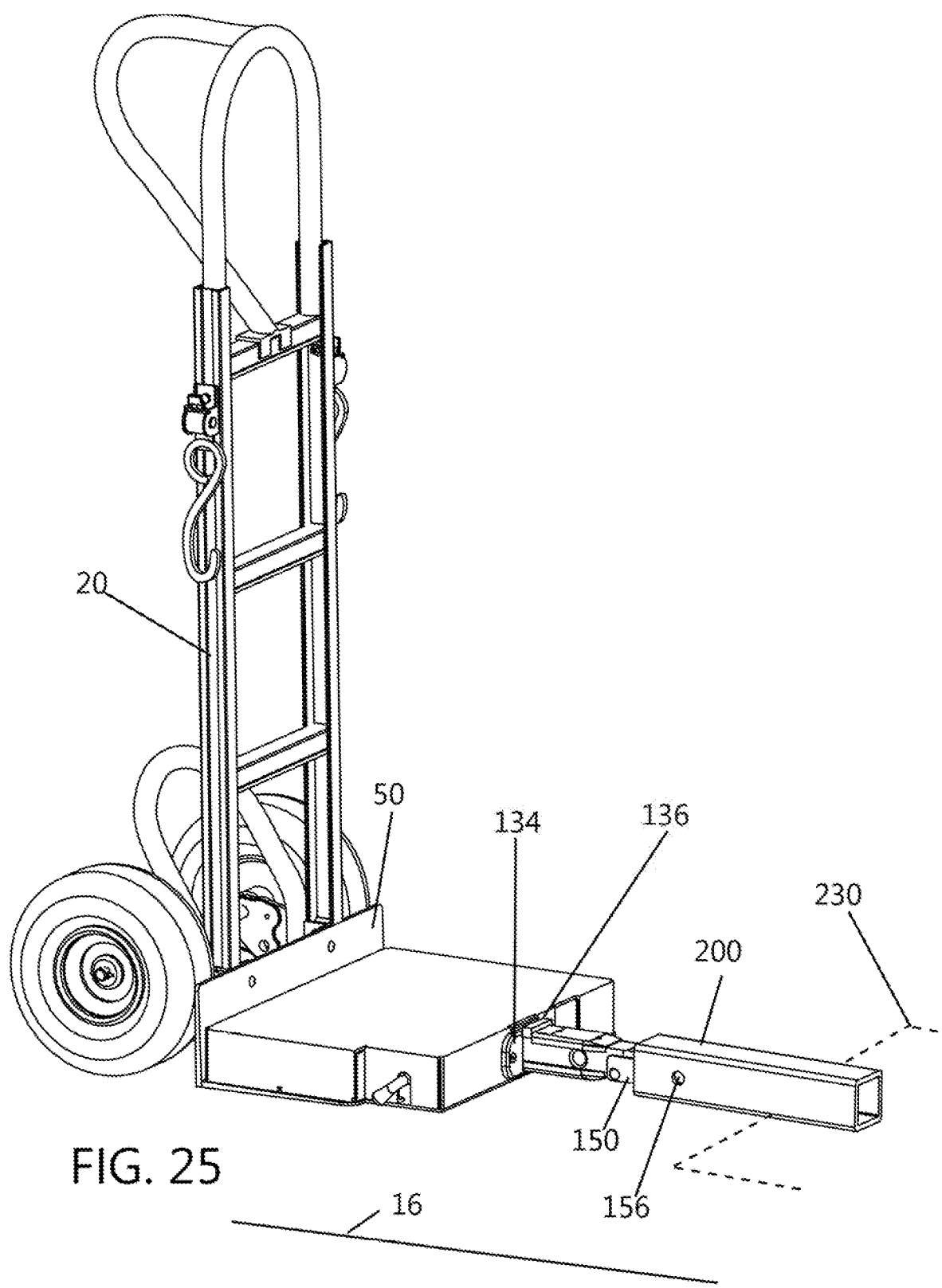
FIG. 25 is a perspective view of the invention of the type illustrated in FIG. 23 and further showing the lever arm retracted into the body or base of loading device of the present invention.
Figure 26:
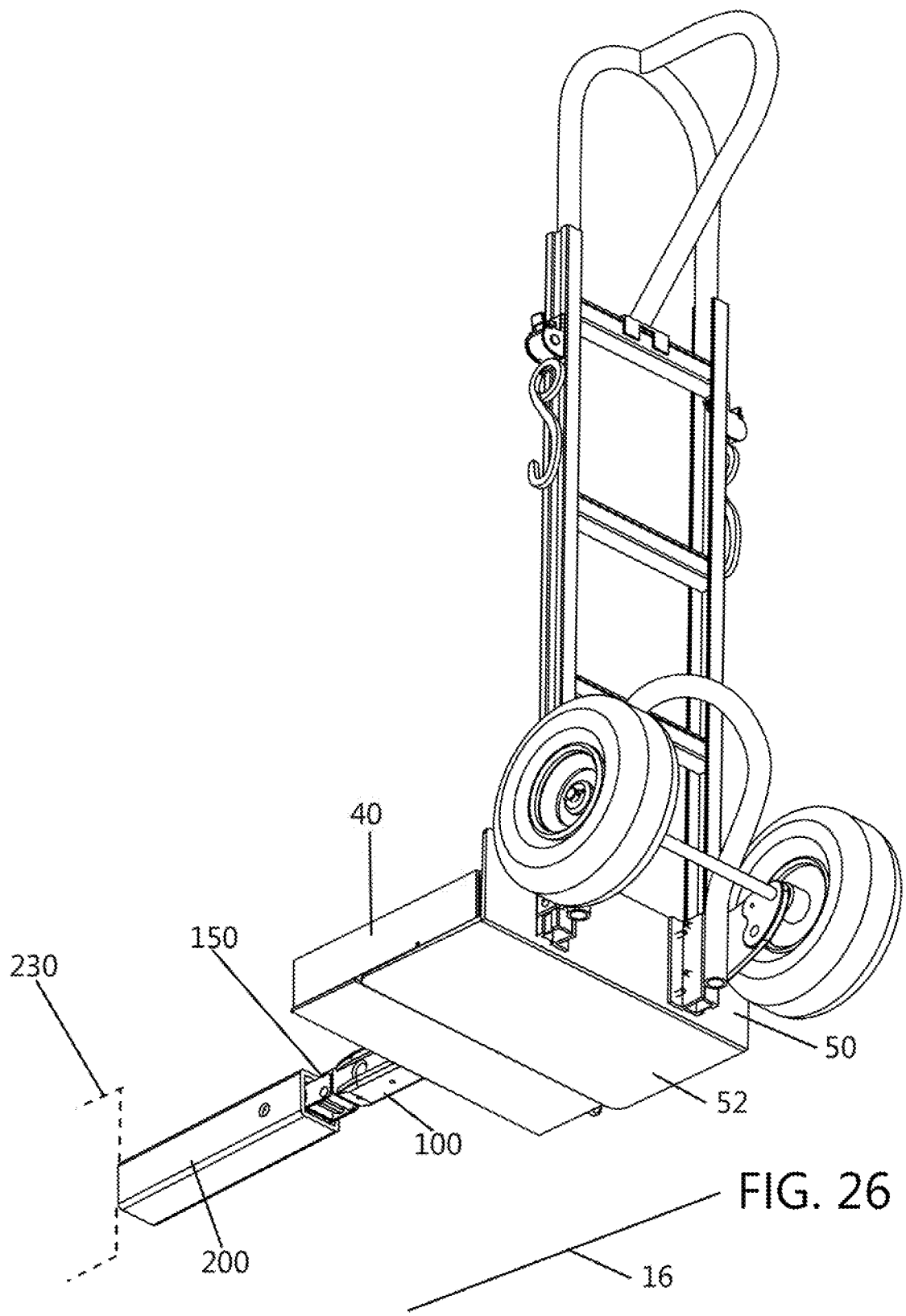
FIG. 26 is a bottom perspective view of the device illustrated in FIG. 25 illustrating the hand truck lifted up and the lever arm or shaft retracting into the body or base of loading device.
Figure 27:
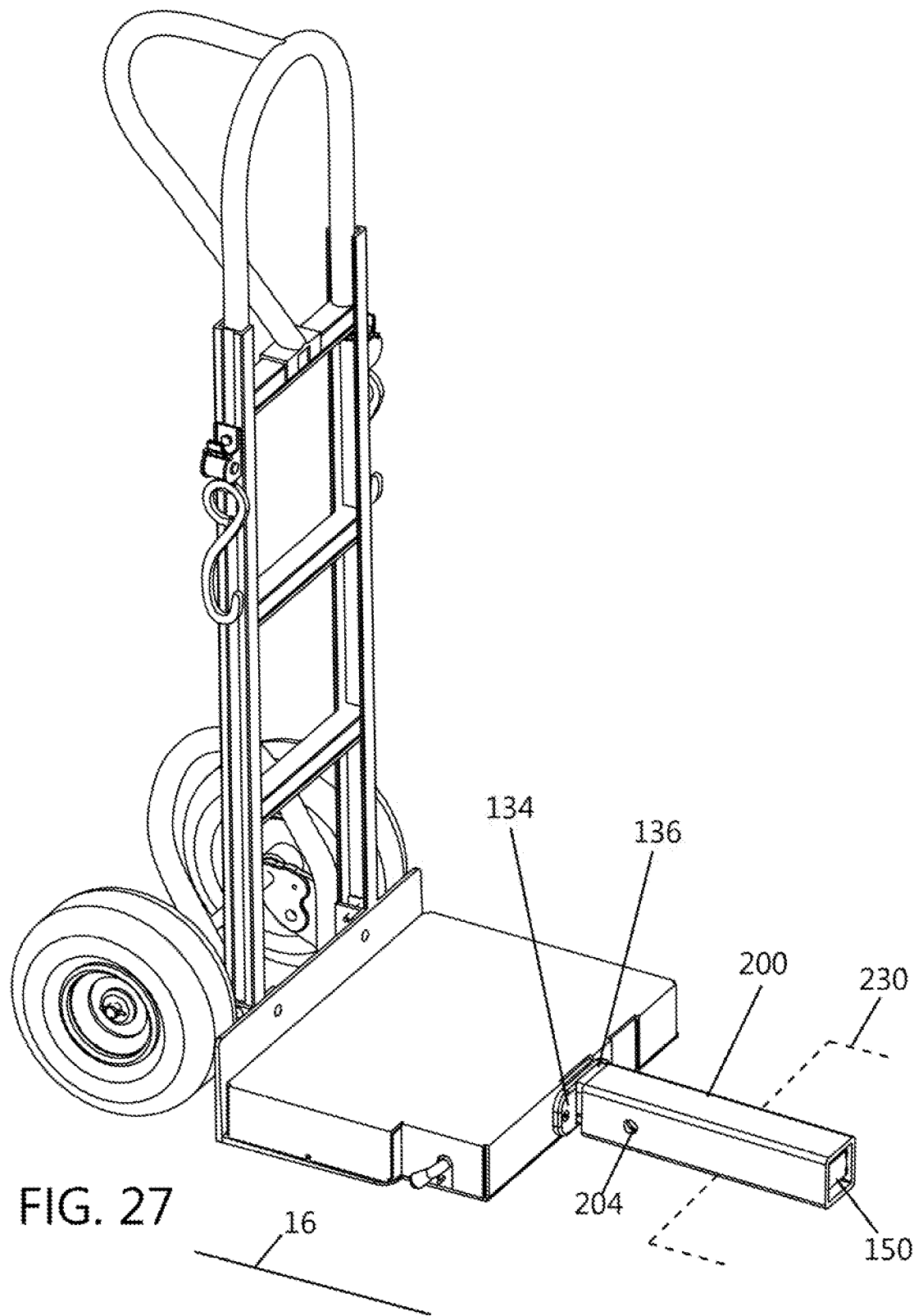
FIG. 27 is a perspective view of the apparatus in accordance with the present invention showing the lever arm or shaft fully inserted into a vehicle receiver and ready to secure with hitch pins and straps.
Figure 28:
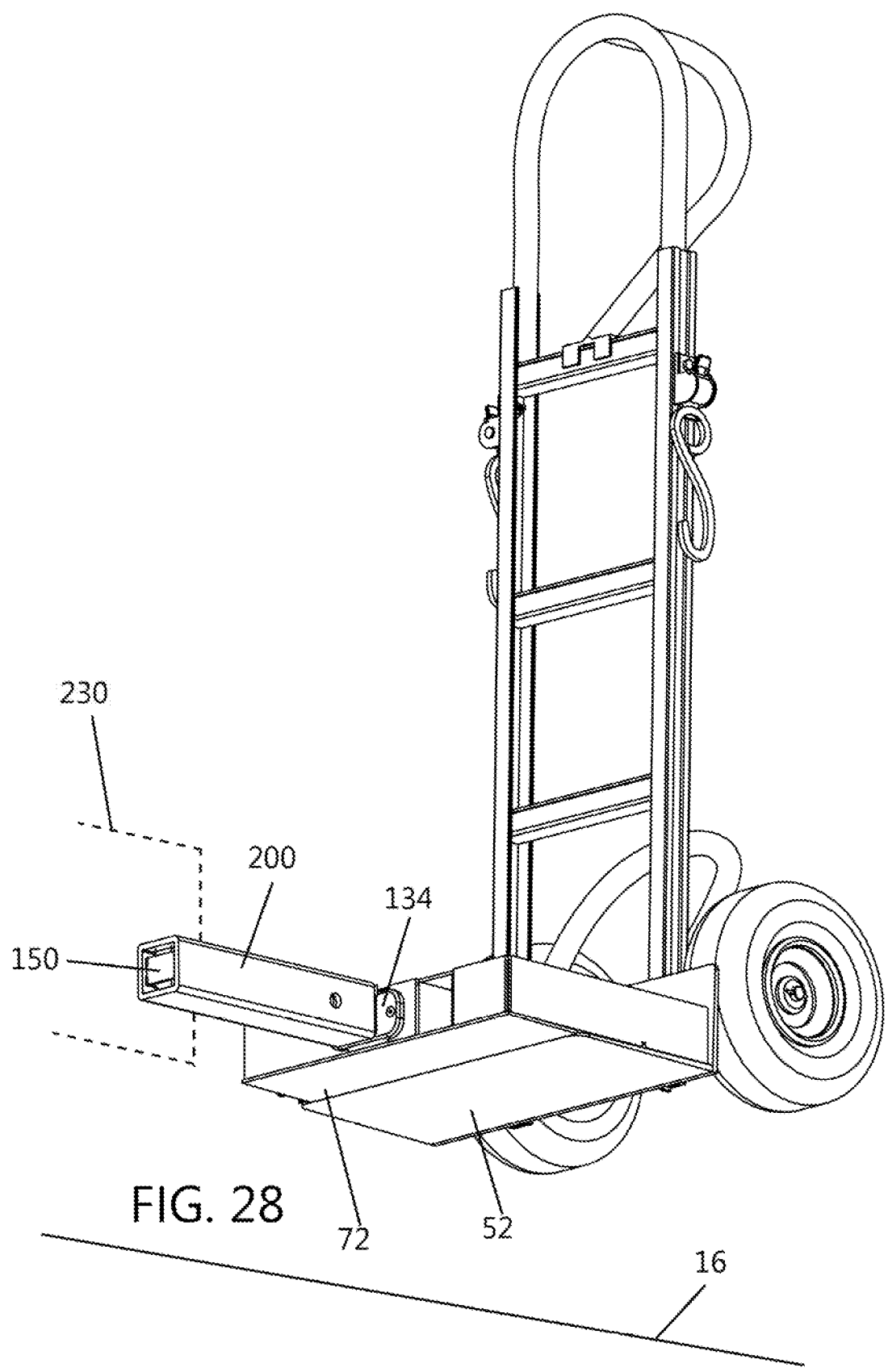
FIG. 28 is a bottom perspective view of the invention of the type illustrated in FIG. 27.
Figure 29:
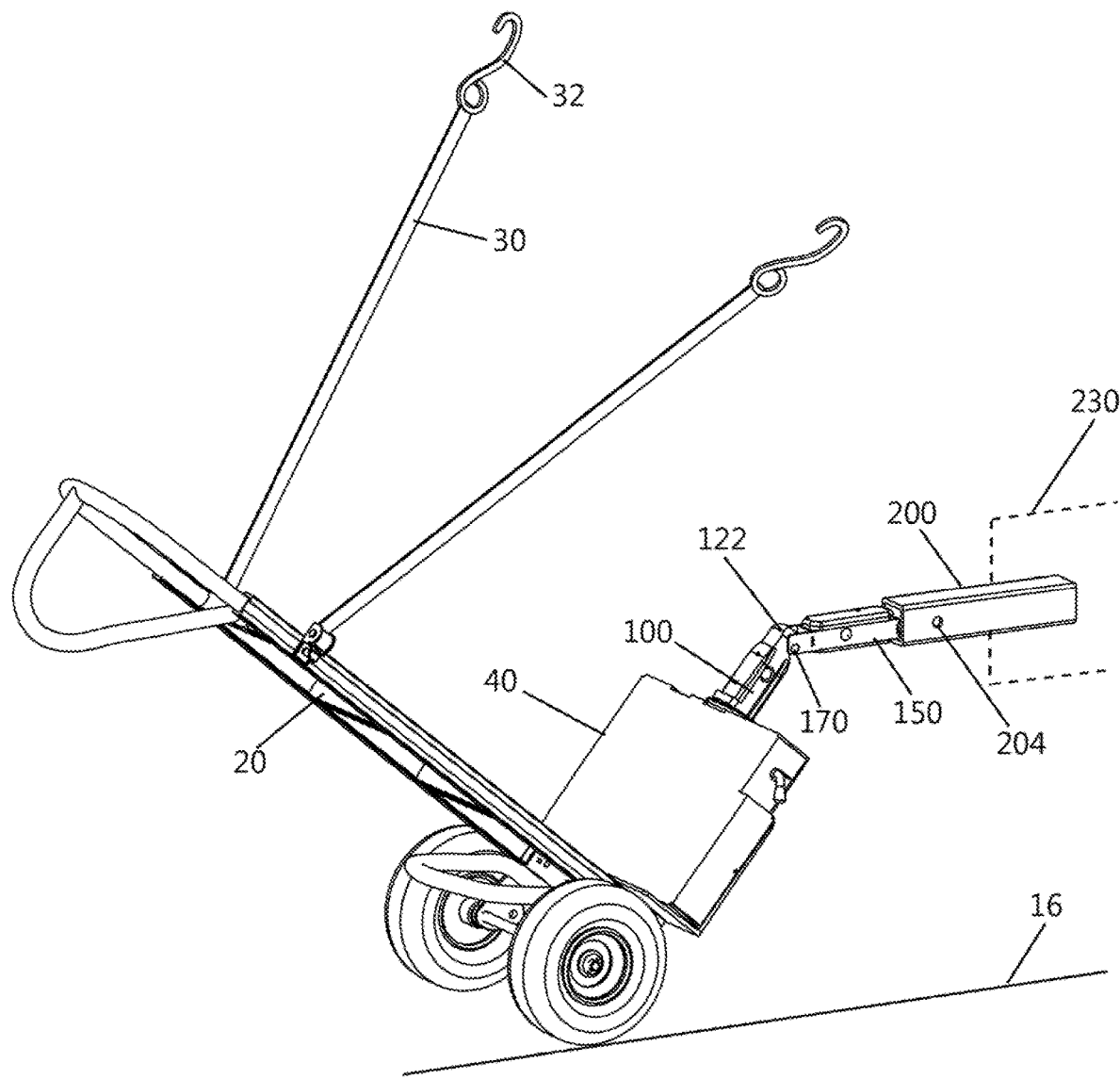
FIG. 29 is a side perspective view illustrating a glide sticking out of receiver and having the lever arm or shaft attached to guide.

FIGS. 17-29 illustrates the use of the assembly to mount a load of a hand truck 20 to a vehicle hitch receiver 200. The hand truck 20 includes a loading handle or grip 22 to assist a user when pushing or pulling on the hand truck to slide the lever arm 100 and glide 150 fore and aft. FIG. 18 illustrates a hand truck 20 coupled to the base 40 together with a glide 150 both of which are positioned near a vehicle hitch 100. When a user desires to connect the dolly to a vehicle, a user then inserts the glide into the vehicle hitch and pushes the glide 150 into the receiver 200. As the glide 150 is pushed into the receiver latch 158 actuates inward against the compression force of spring 160. As the glide is pushed inward into the receiver 200 the latch engages with hitch pin hole 204. The latch includes an angled end portion so that as the user continues to push the glide inward the latch pin 158 will push against the compression force of spring 160 and recede into the glide. The user continues to push the glide 150 inward until the compression buttons 156 engage within the holes 204 of the hitch receiver 200 (see FIGS. 19 and 20). Next the user tilts the hand truck 20 backwards (FIG. 21) and moves the hand truck 20 towards the vehicle hitch 200. The dolly 20 is tilted enough so that the claw 122 is higher than the pivot pin 170 of the glide 150. Once the claw 122 is positioned over the pivot pin 170 the dolly is tilted forward until the claw engages the pivot pin (FIGS. 22 and 23). The dolly 20 is then pivoted or rotated upwards from the ground 16 until the lever arm 100 is in linear alignment with the glide 150 and hitch receiver 200 (FIGS. 24 and 25). Once in linear alignment the lock pin 60 is disengaged the user may apply a force against the hand truck to cause the lever arm 100 to slid into the base 40 (FIG. 26), the free end 120 slides into the receiver until the front stop 136 engages the receiver (FIG. 28) and the glide slides further into the receiver 200. As the slide 150 slides further into the receiver 200 the buttons 156 compress from the sliding force. The compression button 156 disengages from the hitch hole 204 and the glide slides further into the receiver until the front extension stop 136 of the lever arm 100 engages with the hitch receiver 200 (FIGS. 28 and 29). A hitch pin may then be inserted through hitch pin hole 204 and lever arm hole 130 to secure the hand truck vehicle mount assembly 10 to the vehicle.

When the user wishes to remove the dolly from the vehicle the hitch pin is removed and the user pulls the dolly away from the vehicle. As the glide is pulled from the receiver the compression buttons 156 remain compressed inward against the sidewalls and compress as they pass through the hitch pin hole 204. The glide continues to pull from the receiver until latch 158 engages the hitch pin hole 204 so that the glide does not pull completely from the receiver 200. The lock pin 60 on the base 40 is disengaged and the dolly 20 is further pulled outward and away from the vehicle so that the lever arm 100 extends to its extended position from the base 40. The dolly 20 and base 40 may then pivot downward until the wheels contact the ground 16. The dolly is then tilted further to disengage the claw 122 from the pivot pin 170.

Figure 30:
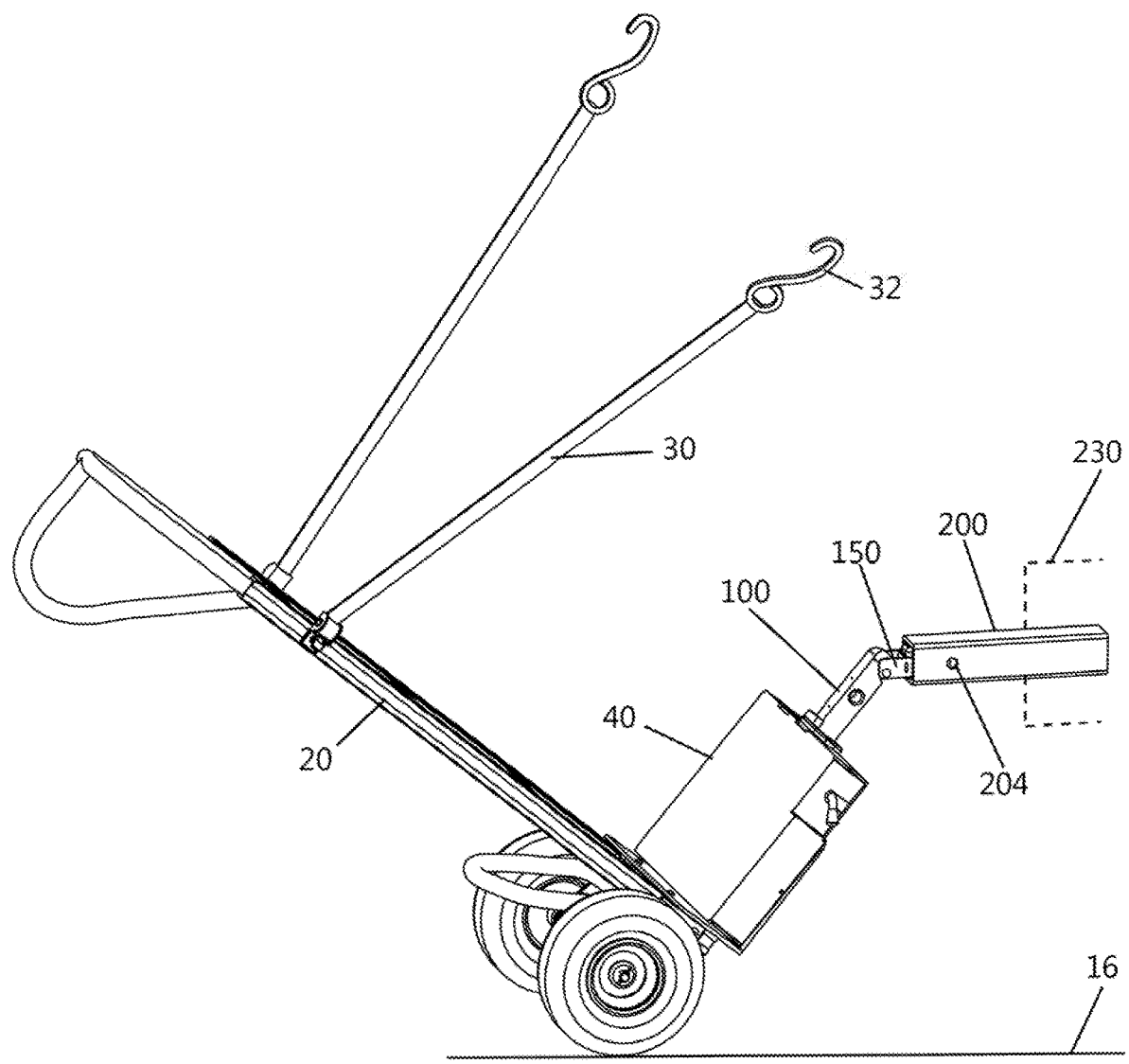
FIG. 30 is a side perspective view of an apparatus in accordance with aspects of the invention showing the lever arm attached to glide and ready for a load to be raised and slid into vehicle receiver.
Figure 31:
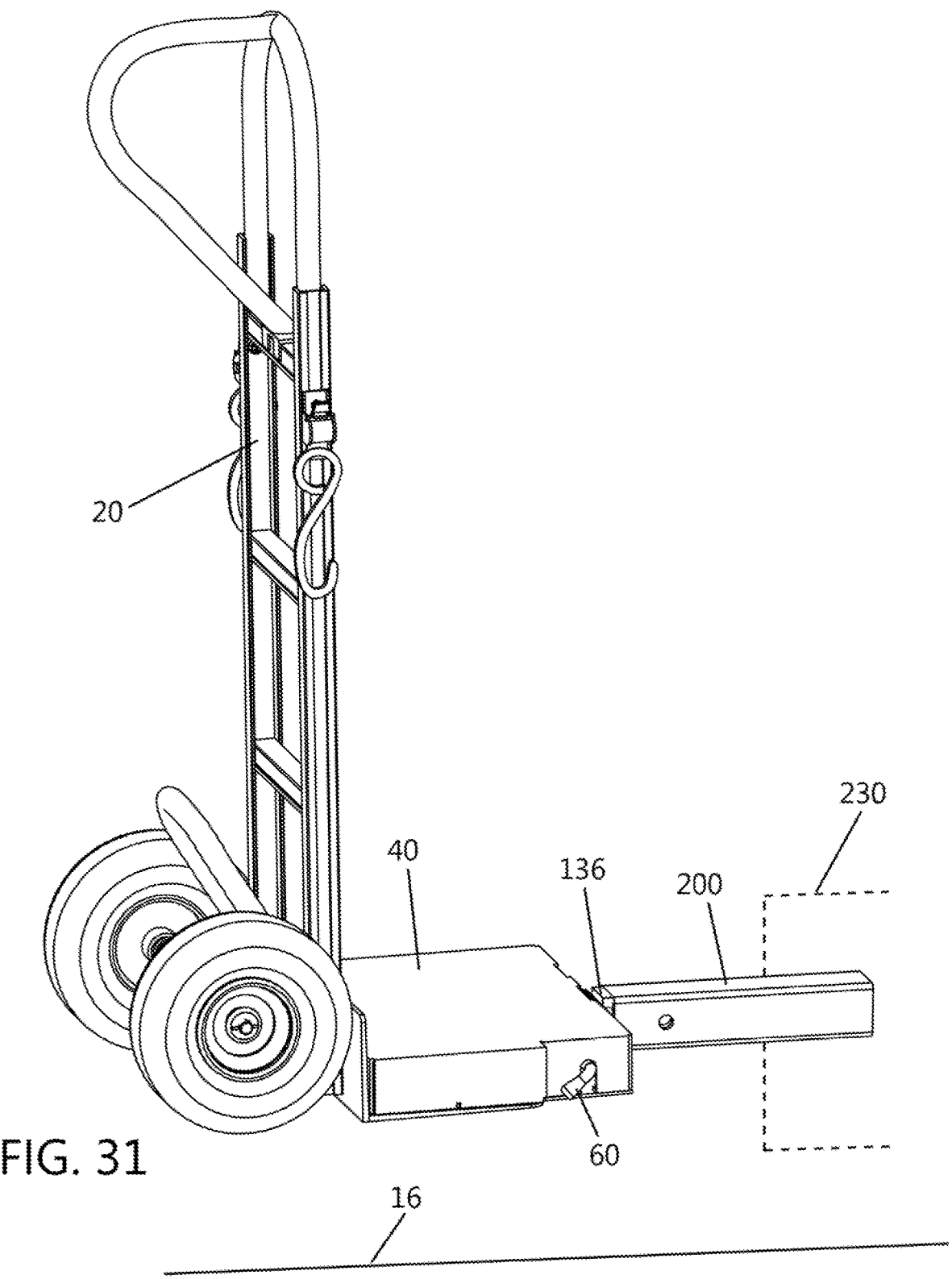
FIG. 31 is a side perspective view of an apparatus in accordance with aspects of the invention showing the hand truck coupled to the vehicle receiver (in a loaded position) and secured at a back of vehicle receiver and ready for transport.

FIGS. 30-32 further illustrates the use of the assembly to mount a load of a hand truck to a vehicle hitch receiver in conjunction with adjustable straps. Although a load on the base 40 and dolly 20 are not illustrated, those skilled in the art can appreciate how a load may be positioned on the base 40 and secured to the dolly 20 with straps 30 and hooks 32. Alternatively, ratchet straps may be used to assist a user when rotating the dolly and base upwards.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. An apparatus for connecting a hand truck to a receiver mounted to a vehicle, the apparatus comprising:
    a base having a hand truck receiving portion;
    a lever arm extending from the base and having a free end portion extending outward from the base; the free end portion includes a claw wherein the free end portion is adapted to be received within a receiver; and
    a glide that is separable from the lever arm and receiver, wherein the glide is adapted to be received within the receiver; and further wherein the glide has a pivot member adapted to couple with the claw of the lever arm.

2. The apparatus as recited in claim 1, further including an end portion of the lever arm that is slidingly extendable from the base.

3. The apparatus as recited in claim 2, further including a lever lock coupled to the base and having a first locked position that engages the lever arm and having a second retracted position that disengages the lever arm from the lock.

4. The apparatus as recited in claim 1, further including a storage slot formed in the base and adapted for storing the glide within the base.

5. The apparatus as recited in claim 1, wherein the glide further includes a button ball release that compresses into the glide and actuates outward from the glide when a compressing force is not present.

6. The apparatus as recited in claim 1, further including a hand truck attachment plate that engages a bottom of the base.

7. The apparatus as recited in claim 1, further including wear plates attached to sides of the glide.

8. The apparatus as recited in claim 1, further including wear plates attached to sides of the lever arm.

9. The apparatus as recited in claim 1, wherein the glide further includes an actuable latch having an end portion extending outward from a side of the glide.

10. An apparatus for connecting a hand truck to a receiver of a vehicle, the apparatus comprising:
    a base having a hand truck receiving portion;
    a lever arm extendable from the base, the lever arm having an end portion slidingly engaged with the base and a free end portion extending outward from the base; the free end portion includes a claw wherein the free end portion is adapted to be received within a receiver; and
    a glide that is separate from the lever arm and receiver, wherein the glide is adapted to be received within the receiver; the glide having a pivot member adapted to couple with the claw of the lever arm.

11. The apparatus as recited in claim 10, further including a lever lock coupled to the base and having a first locked position that engages the lever arm and having a second extending position that disengages the lever arm from the lock.

12. The apparatus as recited in claim 10, further including a storage slot formed in the base and adapted for storing the glide within the base.

13. The apparatus as recited in claim 10, wherein the glide further includes a compressible button ball release that compresses inward into a hollow portion of the glide.

14. The apparatus as recited in claim 10, further including a hand truck attachment plate that engages a bottom of the base.

15. The apparatus as recited in claim 10, further including wear plates attached to sides of the glide.

16. The apparatus as recited in claim 10, further including wear plates attached to sides of the lever arm.

17. The apparatus as recited in claim 10, wherein the lever arm includes an aperture extending through a sidewall of the lever arm, the aperture adaptable to receive a hitch pin.

18. An apparatus for connecting a hand truck to the trailer hitch receiver of a vehicle, the apparatus comprising:
    a base having a hand truck receiving portion;
    a lever arm extendable from the base, the lever arm having a rearward end portion slidingly engaged with the base and a free end portion extending outward from the base; the free end portion includes a claw wherein the free end portion is adapted to be received within a trailer hitch receiver;
    a glide that is separable from the lever arm and trailer hitch receiver, wherein the glide is adapted to be received within the trailer hitch receiver; the glide having a pivot member adapted to couple with the claw of the lever arm; and wherein the glide further includes a compressible button ball release that engages the trailer hitch receiver; and
    a lever lock coupled to the base and having a first locked position that engages the lever arm and having a second extending position that disengages the lever arm from the lock.

19. The apparatus as recited in claim 18, further including wear plates attached to sides of the glide.

20. The apparatus as recited in claim 18, further including wear plates attached to sides of the lever arm.

* * * * *